(12) United States Patent
Nyholt et al.

(10) Patent No.: US 12,499,501 B2
(45) Date of Patent: Dec. 16, 2025

(54) SYSTEM AND METHOD FOR CALLER VERIFICATION

(71) Applicant: TECHJUTSU INC., Calgary (CA)

(72) Inventors: Tracey Nyholt, Calgary (CA); Mike Bond, Calgary (CA); Gabrielle Comeau, Calgary (CA); Chelsea Finnigan, Calgary (CA)

(73) Assignee: TECHJUTSU PROPERTIES INC., Calgary (CA)

( * ) Notice: Subject to any disclaimer, the term of this patent is extended or adjusted under 35 U.S.C. 154(b) by 0 days.

(21) Appl. No.: 17/578,733

(22) Filed: Jan. 19, 2022

(65) Prior Publication Data

US 2022/0245747 A1 Aug. 4, 2022

Related U.S. Application Data

(60) Provisional application No. 63/154,115, filed on Feb. 26, 2021, provisional application No. 63/143,318, filed on Jan. 29, 2021.

(51) Int. Cl.
*G06Q 50/26* (2024.01)
*H04L 9/40* (2022.01)

(52) U.S. Cl.
CPC ....... *G06Q 50/265* (2013.01); *H04L 63/0853* (2013.01)

(58) Field of Classification Search
CPC ... G06Q 50/265; H04L 63/0853; H04L 63/02; H04L 63/0876
See application file for complete search history.

(56) References Cited

U.S. PATENT DOCUMENTS

| | | | | |
|---|---|---|---|---|
| 8,745,718 B1* | 6/2014 | Dufel | ...................... | H04L 63/20 726/8 |
| 8,832,788 B1* | 9/2014 | Gibson | ................... | G06F 21/40 726/28 |
| 10,681,207 B1* | 6/2020 | Johnson | ............ | H04M 3/42042 |
| 10,750,008 B1 | 8/2020 | Cairns et al. | | |
| 11,228,677 B1* | 1/2022 | Cairns | ................... | H04M 3/382 |
| 11,770,706 B1* | 9/2023 | Lilley | ................. | H04L 63/0853 379/265.09 |
| 2006/0059569 A1* | 3/2006 | Dasgupta | ................ | G06F 21/34 726/28 |
| 2006/0294387 A1* | 12/2006 | McCracken | ............ | G06F 21/43 713/182 |

(Continued)

OTHER PUBLICATIONS

Peterson, Jon, Henning Schulzrinne, and Hannes Tschofenig. Secure telephone identity problem statement and requirements. No. rfc7340. 2014. (Year: 2014).*

(Continued)

*Primary Examiner* — Corey Russ
(74) *Attorney, Agent, or Firm* — Norton Rose Fulbright Canada LLP

(57) ABSTRACT

A caller is verified by receiving a unique identifier from the caller, identifying an account based at least in part on the unique identifier, sending a soft token verification request to an identity provider to send a soft token push notification to a device associated with an owner of the account, and receiving a result of the soft token push notification from the identity provider. Upon the result of the soft token push notification being successful, the caller is classified as verified for the account.

14 Claims, 27 Drawing Sheets

(56) References Cited

U.S. PATENT DOCUMENTS

| | | | | |
|---|---|---|---|---|
| 2008/0198991 | A1* | 8/2008 | Saito | H04M 1/663 379/142.05 |
| 2013/0294513 | A1* | 11/2013 | Seregin | H04N 19/52 375/240.14 |
| 2014/0115341 | A1* | 4/2014 | Robertson | G06F 21/30 713/183 |
| 2014/0137199 | A1* | 5/2014 | Hefetz | H04M 15/8033 726/3 |
| 2015/0059003 | A1* | 2/2015 | Bouse | G06F 16/2379 726/28 |
| 2016/0019543 | A1* | 1/2016 | Taylor, III | G06Q 20/40 726/5 |
| 2016/0078430 | A1* | 3/2016 | Douglas | G06Q 30/0185 705/43 |
| 2017/0104870 | A1* | 4/2017 | Mandanapu | H04M 3/436 |
| 2018/0013851 | A1* | 1/2018 | Pollack | H04L 67/55 |
| 2018/0062858 | A1* | 3/2018 | Xu | H04L 9/006 |
| 2018/0089693 | A1* | 3/2018 | Martin | H04M 7/0024 |
| 2018/0278746 | A1* | 9/2018 | Yacov | H04M 7/0012 |
| 2020/0084204 | A1* | 3/2020 | Craswell | H04L 63/0838 |
| 2020/0259830 | A1* | 8/2020 | Shaffer | H04L 63/0823 |
| 2020/0279255 | A1 | 9/2020 | Douglas et al. | |
| 2020/0389552 | A1* | 12/2020 | Trim | H04W 12/61 |
| 2021/0014062 | A1* | 1/2021 | Bhattacharjee | H04L 63/126 |
| 2021/0160231 | A1* | 5/2021 | Kumar | H04L 63/0815 |

OTHER PUBLICATIONS

Chokngamwong, Roongroj. "Increasing the efficiency of one-time key issuing for the first verification caller ID spoofing attacks." 2018 15th International Joint Conference on Computer Science and Software Engineering (JCSSE). IEEE, 2018. (Year: 2018).*

CIPO, Office Action dated Mar. 16, 2023 received in Canadian Patent Application No. 3110613.

Office Action received from Canadian Patent Office in respect of Canadian Patent Application No. 3,110,613 dated Dec. 6, 2023.

* cited by examiner

To block 607 in FIG. 6B

To block 706 in FIG. 7B

To block 907 in FIG. 9B

SYSTEM AND METHOD FOR CALLER VERIFICATION

CROSS-REFERENCE TO RELATED APPLICATIONS

This application is related to and claims the benefit of U.S. Provisional Application No. 63/143,318, filed on Jan. 29, 2021, and U.S. Provisional Patent Application No. 63/154,115, filed on Feb. 26, 2021, the contents of all of which are hereby incorporated by reference.

FIELD

This disclosure relates to security systems, in particular, user authentication or verification of a caller.

BACKGROUND

Entities receiving calls, for example, call centers for organizations such as financial institutions, traditionally use security questions as a means to verify callers, in an example, to verify a caller as an account owner. However, security questions can pose several risks and problems. For example, many personal security questions are easily guessable. Common questions include "What is your birthday?", or "In what city did you meet your partner?". Such "milestone" questions are highly insecure, as many people post about their birthdays or their partners on social media, which is easily accessible to fraudsters.

Security questions based on an account's information can also be difficult for a caller to remember. If a bank asks a caller for details on when they set up their savings account or what their last payment was, it can be hard to remember specifics. Picking an easier question usually results in the question becoming too easy for fraudsters to guess. For example, if the caller lives in a metropolitan area, and their insurance company asks them if they have snowmobile insurance, the answer is probably "no" (and even if they did, a fraudster has a 50% chance of getting a simple yes/no question right without knowing the answer).

Security questions can also be based on a passcode on a caller's bill. Callers need to locate their last bill which can be an added frustration. Visually impaired account owners may have difficulty finding and reading this on their bill, and family fraudsters may have access to the account owner's bill.

SUMMARY

According to an aspect, there is provided a computer-implemented method for verifying a caller, the method comprising: receiving a unique identifier from the caller; identifying an account based at least in part on the unique identifier; sending a soft token verification request to an identity provider to send a soft token push notification to a device associated with an owner of the account; receiving a result of the soft token push notification from the identity provider; and upon the result of the soft token push notification being successful, classifying the caller as verified for the account.

In some embodiments, the sending the soft token verification request is using an application programming interface (API).

In some embodiments, the API is a representational state transfer (REST) API.

In some embodiments, the method further comprises serving a web interface.

In some embodiments, the serving the web interface is over Hypertext Transfer Protocol Secure (HTTPS).

In some embodiments, the method further comprises displaying the result on the web interface.

In some embodiments, the unique identifier includes one or more of an email address, a phone number, or an account number.

In some embodiments, the method further comprises upon the result being unsuccessful, sending a notification of the response to a fraud department.

According to another aspect, there is provided a computer system comprising: a processor; and a memory in communication with the processor, the memory storing instructions that, when executed by the processor cause the processor to perform a method as disclosed herein.

According to a further aspect, there is provided a non-transitory computer-readable medium having computer executable instructions stored thereon for execution by one or more computing devices, that when executed perform a method as disclosed herein.

Other features will become apparent from the following description and appendices.

BRIEF DESCRIPTION OF DRAWINGS

In the figures which illustrate example embodiments.

DETAILED DESCRIPTION

Figure 1:
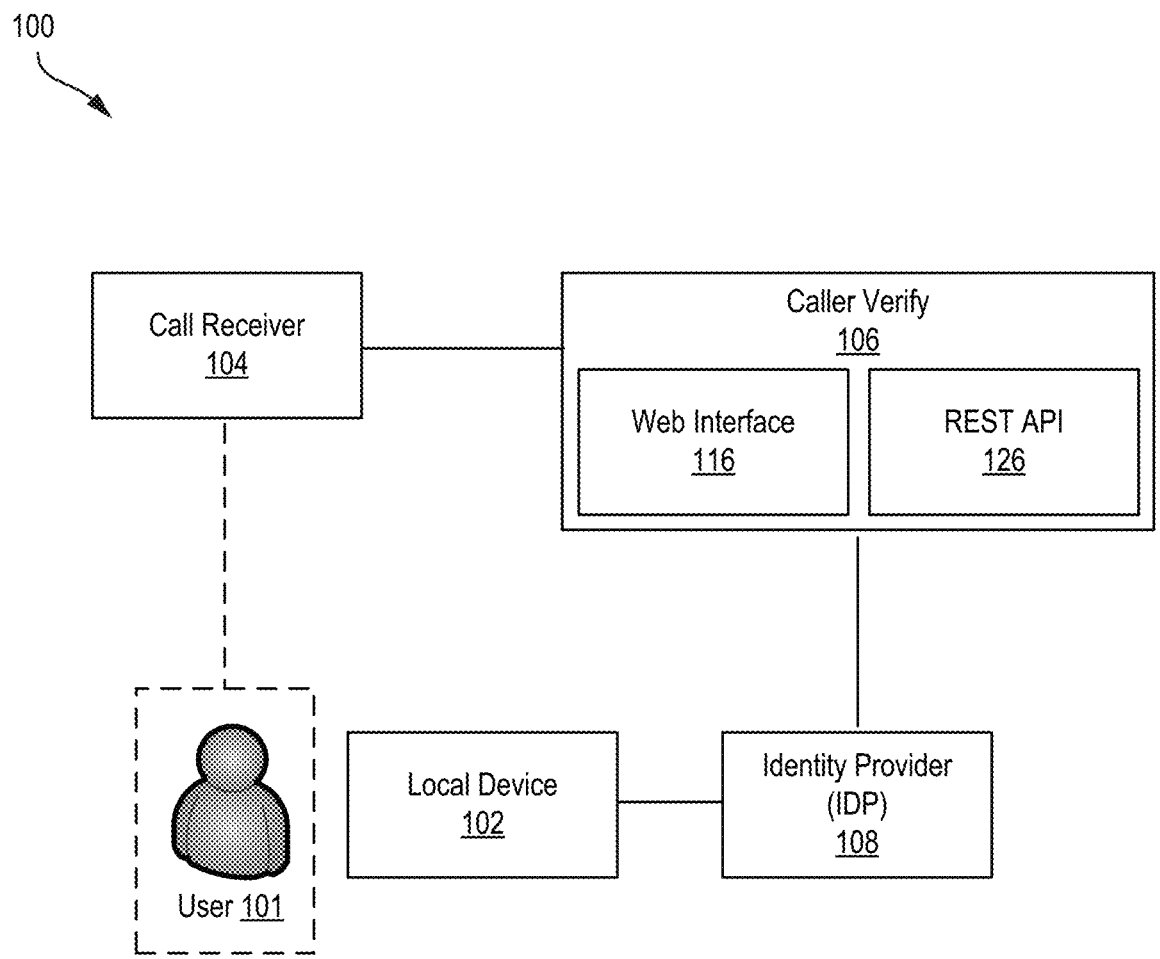
FIG. 1 is a schematic diagram of a system for caller verification, according to an embodiment.

In verifying the identity or status of a caller as an account owner, organizations such as financial institutions can struggle using traditional techniques to prevent and detect fraud. In an example, a family member who knows enough about the victim to answer their security questions could call into the financial institution help desk and impersonate the victim. The family member could then commit fraud by having a wire transfer sent from the victim's account to theirs. Existing solutions to improve security can be too time-consuming, too expensive, too insecure, or all three.

Other traditional caller verification techniques include using PIN or text codes, which can also be vulnerable. PINs can be stolen, either by intercepting SMS messages intended for a caller, or by executing a SIM swap attack on the caller.

Existing caller verification systems are vulnerable to compromise and attack for a variety of reasons.

Security questions are vulnerable to social engineering or family fraud and are answers are often publicly available on the caller's social media accounts (such as birthdate). Security questions place a burden on the caller to remember responses to questions that are often challenging for callers with memory issues or elderly callers. Security questions are also a burden to the organization, as changes must be maintained and it is often difficult to port them to new systems, when systems are inevitably upgraded or replaced.

SMS (text message) verification is vulnerable to SIM swap attacks that occur when a bad actor steals a phone number from the rightful owner by impersonating them on a call with the telecom that provides service to the phone number. SMS (text message) notifications are also vulnerable to being intercepted by spyware or monitoring applications on a caller's phone. This is a particular concern with family fraud, as family fraudsters often have access to seeing SMS notifications displayed on the victim's devices. Furthermore, text message codes may be difficult to read for visually challenged callers.

Existing solutions have a significant amount of friction for the caller, who may get frustrated typing codes into the phone or having to remember forgettable or changing security questions. This encourages callers to follow poor practices such as writing down codes and security answers, or setting weak codes or security answers that are easy to guess. This feedback loop leaves callers more vulnerable to phishing or fraud by encouraging them to weaken their own security posture.

A system and method for caller verification, as disclosed herein, may ensure that callers are who they say they are, for example, account owners. This may be achieved in some embodiments using a secure factor (a soft token) as a secure factor of authentication on the caller's online and mobile banking platforms) to a call center so that callers have a consistent, secure and easy experience. A video explainer outlining an overview of an embodiment can be found at: https://www.youtube.com/watch?v=Gyds7IJytZo.

Embodiments as disclosed herein may allow for a caller's identity to be securely and easily verified when they phone an organization, to prevent the caller from making any changes to an account owner's account if they are not the rightful account owner.

Embodiments as disclosed herein provide a new combination of a security concept and a novel process, combining the security of a soft token verification and a novel process of verifying callers to a call center, an Interactive Voice Response (IVR) or an automated telephony system.

Soft tokens are a form of authentication token traditionally used in a first-party process, where users verify themselves signing on to a computer or similar device. Soft tokens have not previously been applied in a third-party call center or IVR process where callers are verified via third-party interaction as disclosed herein.

This new process of caller verification disclosed in embodiments disclosed herein introduces soft token verification via the third-party interaction with a call center agent or IVR. This verification is facilitated by embodiments of caller verify as disclosed herein. This unique process marries the security concept of soft tokens with the need for verifying callers to a call center or IVR.

Embodiments as disclosed herein may address some of the time-consuming and interoperability issues of existing solutions by:

Having callers use a secure soft token to verify their identity. The token is not vulnerable to SIM swap attacks as SIM swapping only gets a fraudulent caller the phone number, not the contents of the phone. The secure token application also does not transmit an SMS signal and isolates it from being scraped or recorded, making it resistant to spyware applications on the phone itself.

Providing a lightweight interoperable service that can be connected to an organization's current identity provider via API. This reduces the organization's barrier to adopting more secure caller verification for callers by reducing the cost and labor involved in implementing secure verification.

Embodiments disclosed herein can be highly accessible. Soft token applications are usually free and widely available. They are easy to use for callers who are visually impaired or memory impaired. Soft tokens offer consistency of experience as callers can use the same soft token they use with embodiments disclosed herein, on their online or mobile experiences with the organization's other applications.

A caller can be verified using embodiments disclosed herein in under 30 seconds whereas text code or security question verification can take 2-10 minutes. This facilitates time savings for both the caller and organization, as well as cost savings for the organization.

Caller friction can be reduced by embodiments disclosed herein as the caller does not have to remember answers to security questions or be frustrated by entering awkward text codes.

Embodiments of a system and method for caller verification as disclosed can make both organizations and callers more secure, while being easy for both to use. It places secure verification in the reach of all organizations.

FIG. 1 is a schematic diagram of a system 100 for caller verification, for example, to confirm that a caller such as a user 101 is an account owner, to allow them access to account information and changes, according to an embodiment.

As shown in FIG. 1, system 100 can include a local device 102 associated with an account user, who may or may not be the same individual as user 101, a call receiver 104, a caller verify 106, and an identity provider (IDP) 108. User 101 can be in communication with call receiver 104, for example using local device 102 or other suitable device, by way of plain old telephone service (POTS) or Public Switched Telephone Network (PSTN), Voice over IP (VOIP) or other suitable communication protocol, for example, for voice telephony. Call receiver 104, caller verify 106, IDP 108 and local device 102 can be in communication by way of a suitable network, for example, be a packet-switched network, in the form of a LAN, a WAN, the public Internet, a Virtual Private Network (VPN) or the like.

Local device 102 is a computing device associated with user 101.

Local device 102, may be, for example, a mobile device. Example mobile devices include without limitation, cellular phones, cellular smart-phones, computers, laptops, handheld wireless communication devices, wirelessly enabled notebook computers, tablet computers, or any other portable electronic device with processing and communication capabilities, for example, with the ability to download and manage soft token applications. In one example, computing device 102 may be a smartphone.

Call receiver 104 can be human agent, embodied as call center 114, or an interactive voice response (IVR) 124, or a combination of both. IVR 124 can be an automated telephony system that interacts with callers such as user 101, gathers information, and routes calls to the appropriate recipients.

Embodiments of caller verify 106 include a user interface or web interface 116 and an application programming interface (API), an interface that defines interactions between multiple software systems. In an example, caller verify 106 includes a Representational State Transfer (REST) API 126, a software architecture for interactive applications.

In some embodiments, web interface 116 is a lightweight, cloud-hosted user interface for use by call center agents of call center 114. Web interface 116 can be built in Python and based on the Flask web application framework, or other suitable application framework. A widget is another way the concept can be extended.

In some embodiments, web interface 116 is built as a single page web application from which call center agents at call center 114 may verify a caller or access an account owner's account in the Organization's Identity Provider (IDP) to make changes.

In some embodiments, web interface 116 is hosted on cloud infrastructure which provides availability, scalability, and network access security.

Hosting for web interface 116 may be provided by cloud providers in containers which can be geographically localized to provide improved connectivity to clients and integrated services and provide scalability, as web interface containers can be automatically scaled up or out depending on the needs of the client and to support high traffic spikes.

A cloud infrastructure can also provide network access security by supporting access restrictions and WAF (web application firewall) rules to target specific access to network segments. In an example, only designated staff may be allowed to access the web interface from the corporate network.

Caller verify 106 can include an API such as REST API 126. REST API 126 may utilize several technologies to ensure that only validated requests are permitted. In some embodiments, REST API 126 is protected with an access token. A valid OAuth 2.0 access token may be used to authenticate an agent at call center 114 or a service application, provided by the identity provider during authentication. The access token audience may authenticate by matching the client ID associated with IDP 108.

Conveniently, embodiments of caller verify 106 may allow for easy integration to an IVR 124, which can be an IVR systems such as Genesys via Genesys API (Application Programming Interface) endpoints, as well as integration to IDP 108, such as Okta and PING Federate by implementing the IDP's APIs to send factor prompts and parse responses.

Caller verify 106 may also support integration with an organization's multi-factor authentication (MFA) policies to secure access from call receiver 104, such as agents at a call center 114, to the application. This is typically handled via a widget or API provided by an IDP.

Caller verify 106 may support integration with publicly available third party tokens, and soft tokens/authenticator applications, such as those freely available on Google Play or the Apple Store.

Tokens used with caller verify 106 may be customizable, and in an example, may be selected by an organization using it. In some embodiments, soft tokens used with caller verify 106 may be branded and customized if the soft token supports such customizations. For example, instead of the soft token message to the caller saying: "did you just try to log in", the message may be customized to say: "Did you just try to verify yourself at your friendly-neighborhood bank?"

In some embodiments, caller verify 106 logs all verification events in accordance with security and audit best practices.

In some embodiments, caller verify 106 does not store any PII (personally identifying information) of a user 101 or account owner, and only shows the minimum Personally Identifiable information (PII) necessary to identify user 101.

IDP 108 can be used to store account owner profiles, and in some embodiments can be a third-party tool. Examples of possible identity providers are Okta or PING Federate.

IDP 108 may implement soft token authentication for use with local device 102 associated with user 101 to authenticate local device 102, and thus user 101. Soft token authentication can provide multi-factor authentication. A soft token differs from a hard token which is a physical device, whereas a soft token is provided using installed software or applications (usually on a smart phone such as local device 102). Soft token authenticators can be freely available applications on Google Play or Apple Store that securely authenticate a user.

A soft token/authenticator application may provide improved security than email, text message, or phone call PINs. Use of these authenticators is recommended by the National Institute of Standards and Technology (NIST), among others, (Paul A. Grassi, 2017). NIST is a non-regulatory agency of the US Department of Commerce. NIST supplies industry, academia, and government with standards for key operations, including cybersecurity standards.

Soft token authenticators may be advantageous since soft token applications are tied to a particular installation on a specific device and not to a phone number that can be moved or ported; transmissions to soft token applications are encrypted, which increases their security and reduces the risk of a PIN being intercepted by spyware; soft token applications will only accept a push once per authentication to prevent replay attacks. A replay attack is a form of network attack in which valid data transmission is maliciously or fraudulently repeated or delayed.

Figure 2:
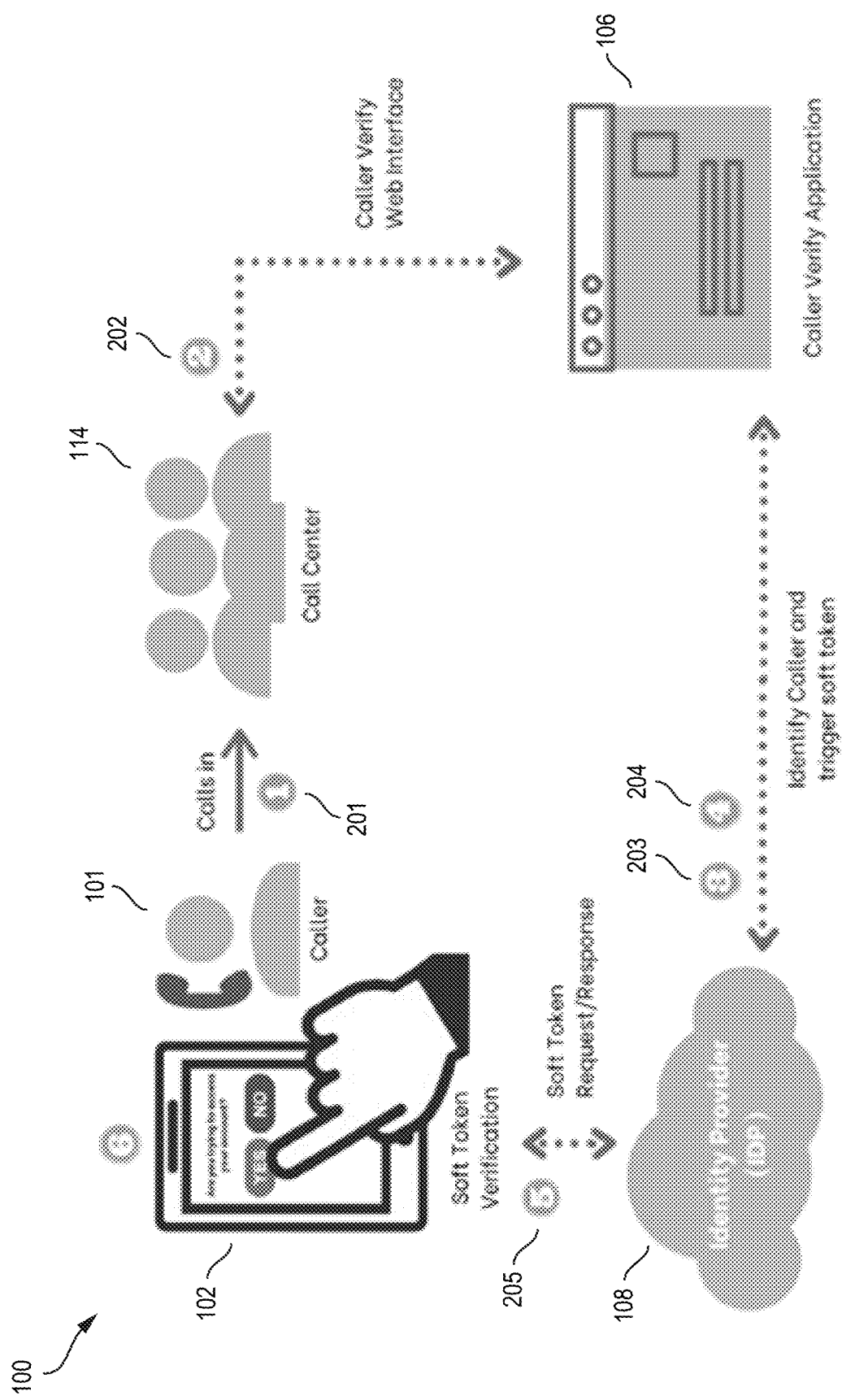
FIG. 2 is a high-level architecture diagram of a system for caller verification including a call center, according to an embodiment.

FIG. 2 illustrates a high-level architecture of system 100 having call center 114, and interaction or work flows between a user 101 attempting to access an account, call center 114, caller verify 106, the account owner (who may be user 101), and a soft token registered with the account in IDP 108, according to an embodiment.

At work flow 201, user 101, a caller, phones into call center 114 and a call center agent answers.

At work flow 202, the call center agent navigates to caller verify 106 to retrieve the account profile via a unique attribute provider by user 101 (for example, phone number, email, account number, etc.). In some embodiments, caller verify 106 web interface 116 is served over Hyper Text Transfer Protocol Secure (HTTPS) (port 443) network protocol that is used to request, navigate, and deliver web content (such as web pages, web applications, APIs, etc.).

At work flow 203, caller verify 106 communicates with IDP 108 using an exposed REST API 126 to retrieve the account profile. In some embodiments, REST API 126 is served over HTTPS (port 443).

At work flow 204, caller verify 106 communicates with IDP 108 using exposed REST API 126 to trigger a soft token verification request to the account owner's registered local device 102, such as a cell phone.

At work flow 205, a push notification as an automated message sent by an application to a user when the application is not open, which may be easy to use, for the soft token verification is sent to local device 102 for display on local device 102, for example, the account owner's registered cell phone. The account owner can respond to the soft token verification on local device 102, in an example, by selecting either [YES] or [NO].

Figure 3:
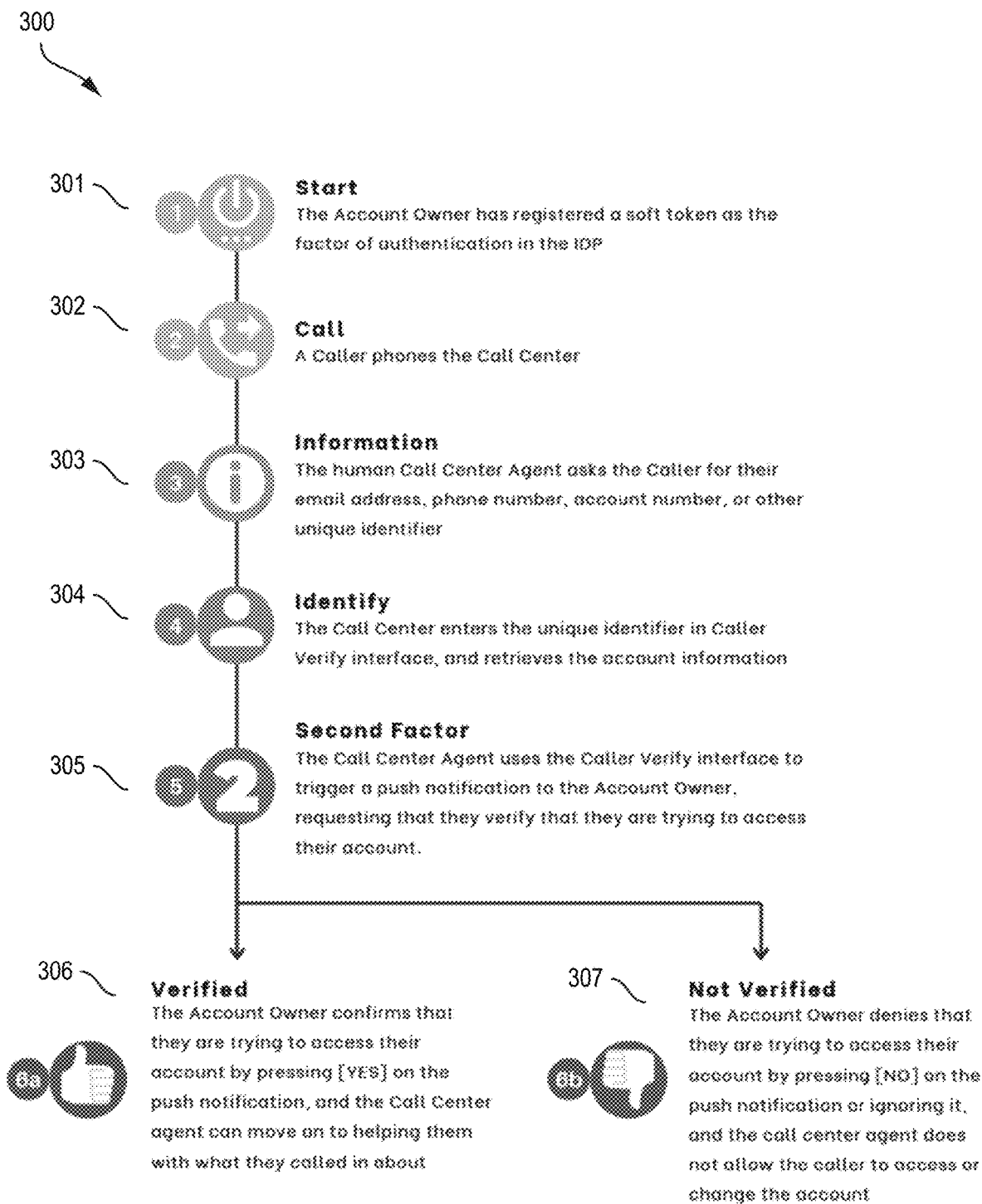
FIG. 3 is a flow chart of a method for verifying a caller with a call center, according to an embodiment.

FIG. 3 illustrates a flow chart of a method 300 for verifying a caller performed, in an example, by components of system 100 including call center 114, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

At block 301, an account owner has registered a soft token as the factor of authentication in IDP 108.

At block 302, a caller, such as user 101, phones call center 114.

At block 303, a human call center agent at call center 114 asks user 101 for their email address, phone number, account number, or other unique identifier.

At block 304, call center 114 enters the unique identifier in caller verify 106 interface, and retrieves the account information.

At block 305, the call center agent uses caller verify 106 interface to trigger a push notification to the account owner, requesting that they verify that they are trying to access their account.

At block 306, if the account owner confirms that they are trying to access their account, for example, by pressing [YES] on the push notification, the call center agent can move on to helping them with what they called in about.

At block 307, if the account owner denies that they are trying to access their account, for example, by pressing [NO] on the push notification or ignoring it, the call center agent does not allow the caller to access or change the account.

Figure 4:
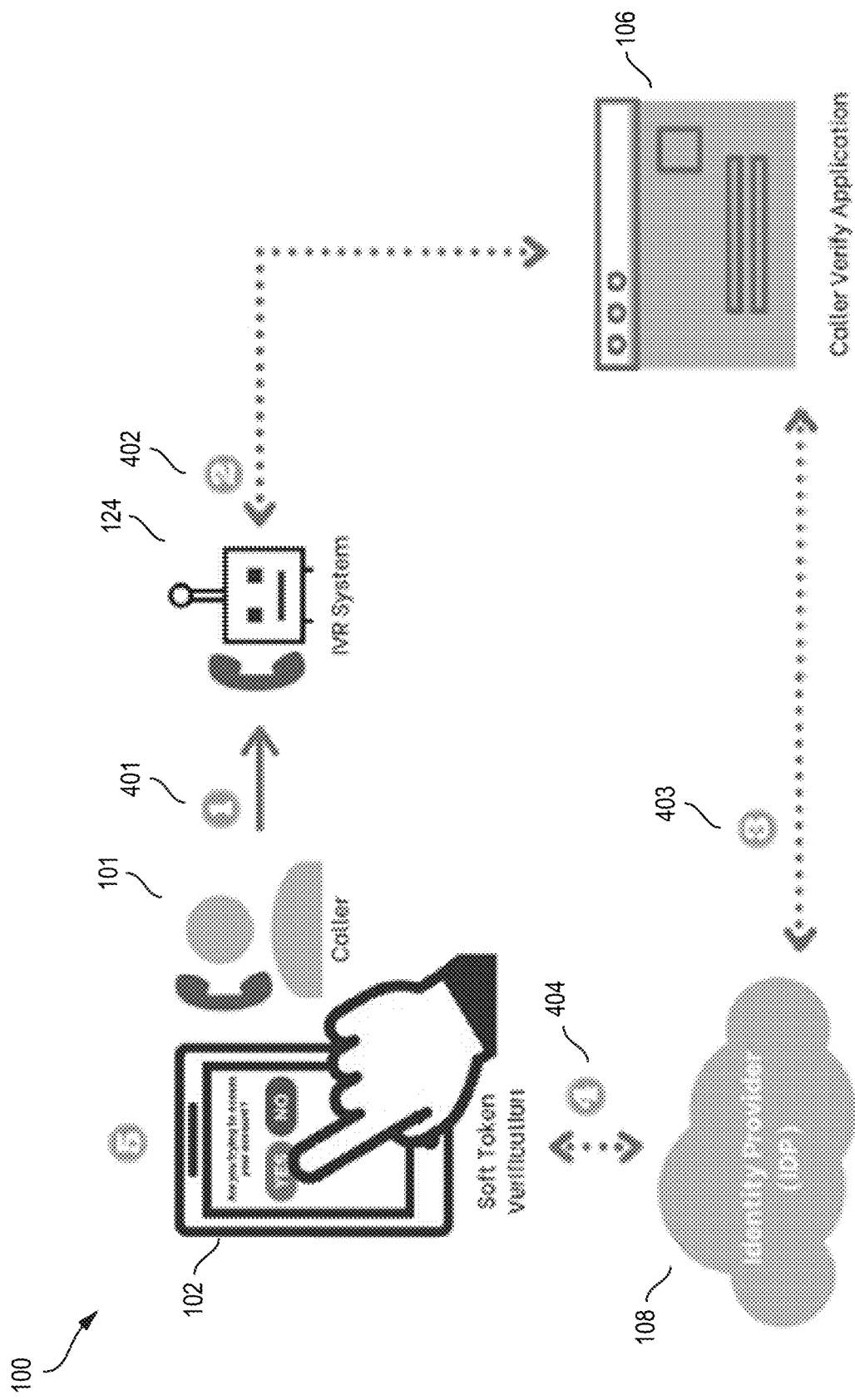
FIG. 4 is a high-level architecture of a system for caller verification including Interactive Voice Response (IVR), according to an embodiment.

FIG. 4 illustrates a high-level architecture of system 100 having IVR 124, illustrating interaction between a user 101 attempting to access an account, IVR 124, caller verify 106, the account owner (who may be user 101), and a soft token registered with the account in the identity provider, according to an embodiment.

At work flow 401, a caller, such as user 101, phones into a call center and IVR 124 answers.

At work flow 402, IVR 124 communicates with caller verify 106 using exposed REST API 126 to retrieve the account profile. REST API 126 is served over HTTPS (port 443).

At work flow 403, IVR 124 communicates with caller verify 106 using exposed REST API 126 to trigger a soft token verification request to the account owner's registered cell phone, such as local device 102.

At work flow 404, an easy to use, accessible push notification for the soft token verification is displayed on local device 102. The account owner responds to the soft token verification on local device 102, in an example, by selecting either [YES] or [NO].

IVR 124 can then communicate with caller verify 106 using exposed REST API 126 to retrieve the result of the soft token verification.

Figure 5:
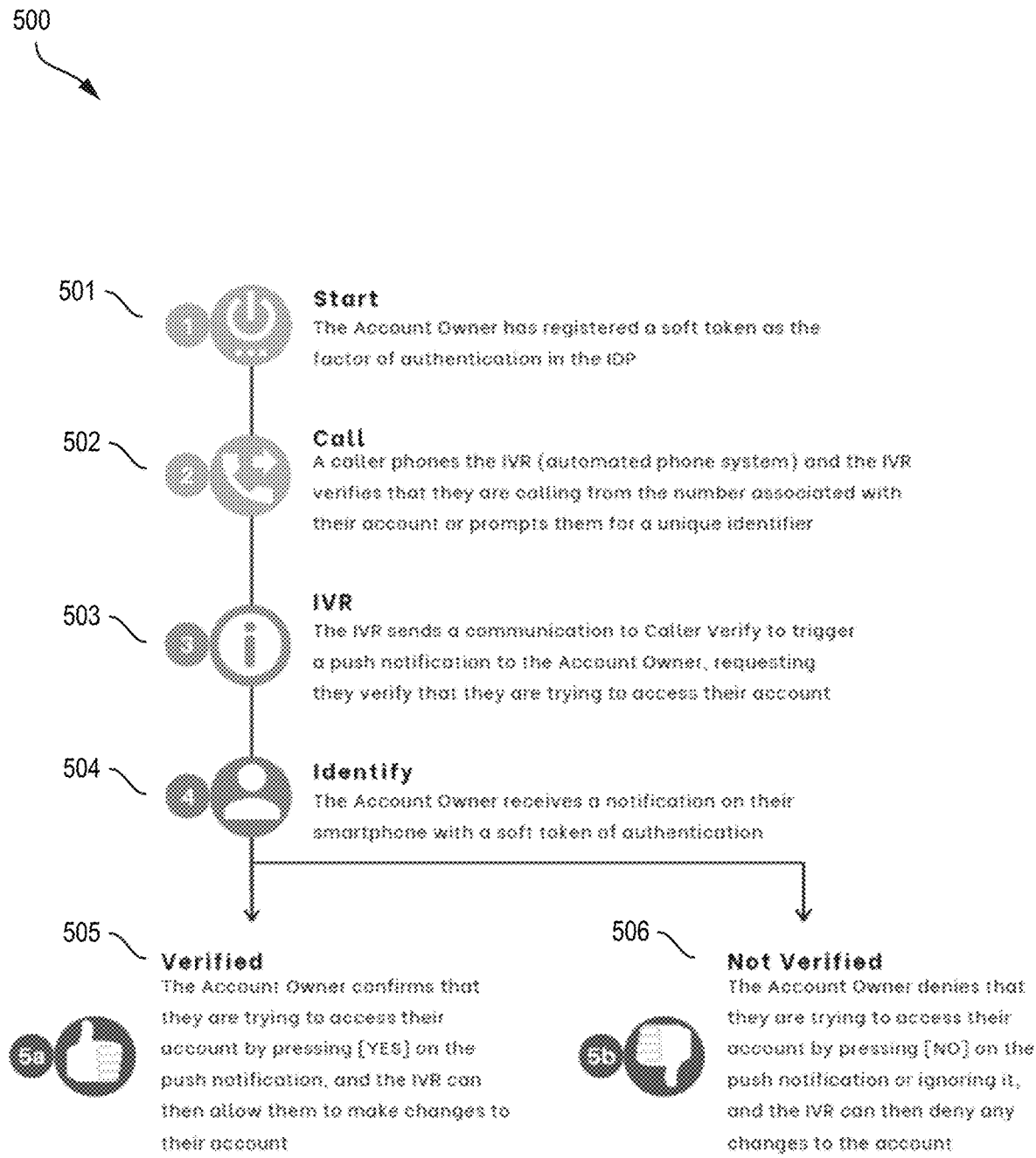
FIG. 5 is a flow chart of a method for verifying a caller with IVR, according to an embodiment.

FIG. 5 illustrates a flow chart of a method 500 for verifying a caller performed, in an example, by components of system 100 including IVR 124, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

At block 501, an account owner has registered a soft token as the factor of authentication in IDP 108.

At block 502, a caller, such as user 101, phones IVR 124 (automated phone system) and IVR 124 verifies that user 101 is calling from the number associated with the requested account or prompts user 101 for a unique identifier.

At block 503, IVR 124 sends a communication to caller verify 106 to trigger a push notification to the account owner, requesting that the account owner verifies that they are trying to access their account.

At block 504, the account owner receives a notification on local device 102, such as a smartphone, with a soft token of authentication.

At block 505, if the account owner confirms that they are trying to access their account, in an example, by pressing [YES] on the push notification, IVR 124 can then allow user 101 to make changes to their account.

At block 506, if the account owner denies that they are trying to access their account, in an example, by pressing [NO] on the push notification or ignoring it, IVR 124 may then deny any changes to the requested account.

Figure 6A:
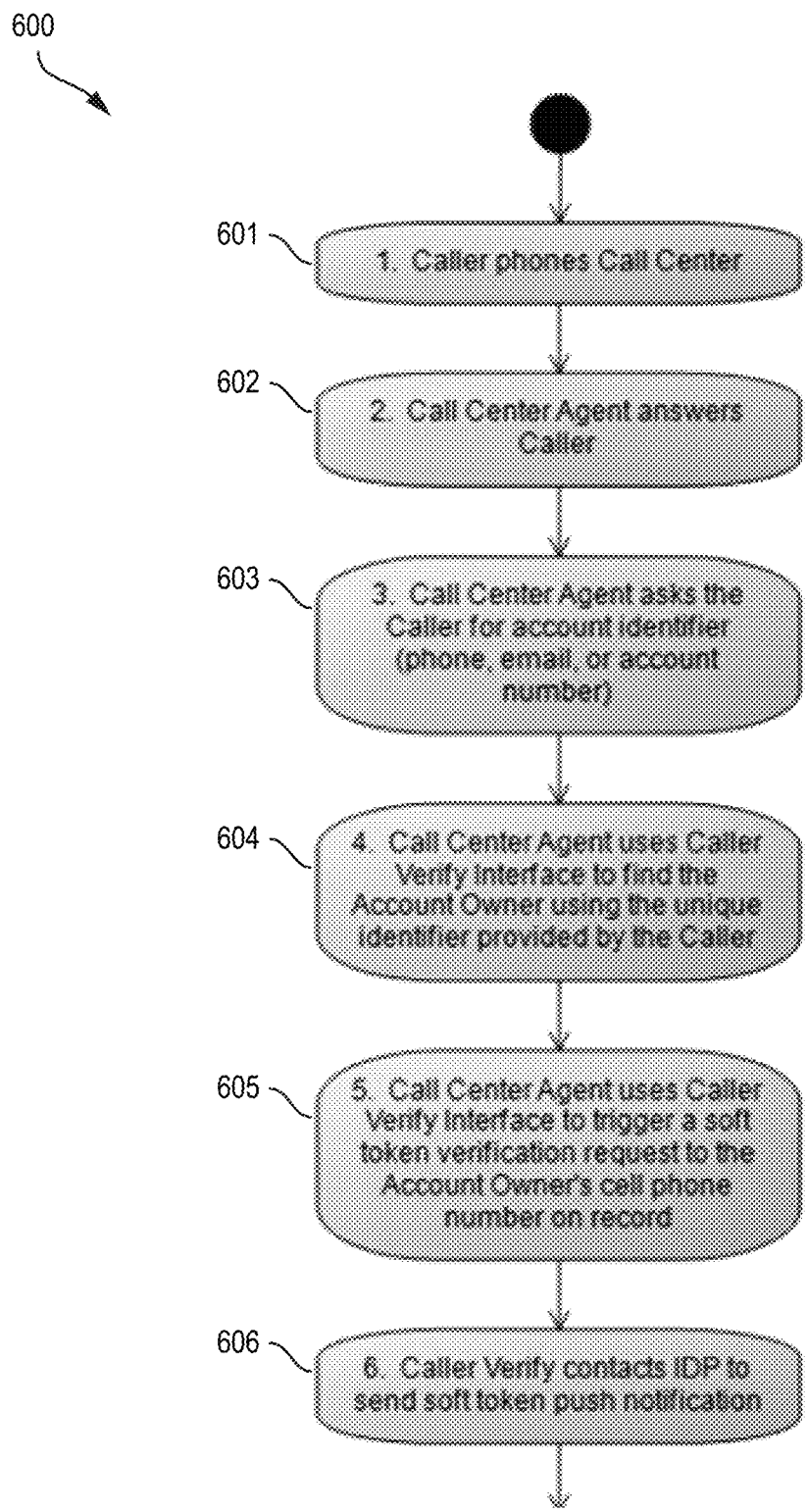
FIGS. 6A-6B illustrate a flow chart of a method of caller verification via soft token success with a call center agent, according to an embodiment.
Figure 6B:
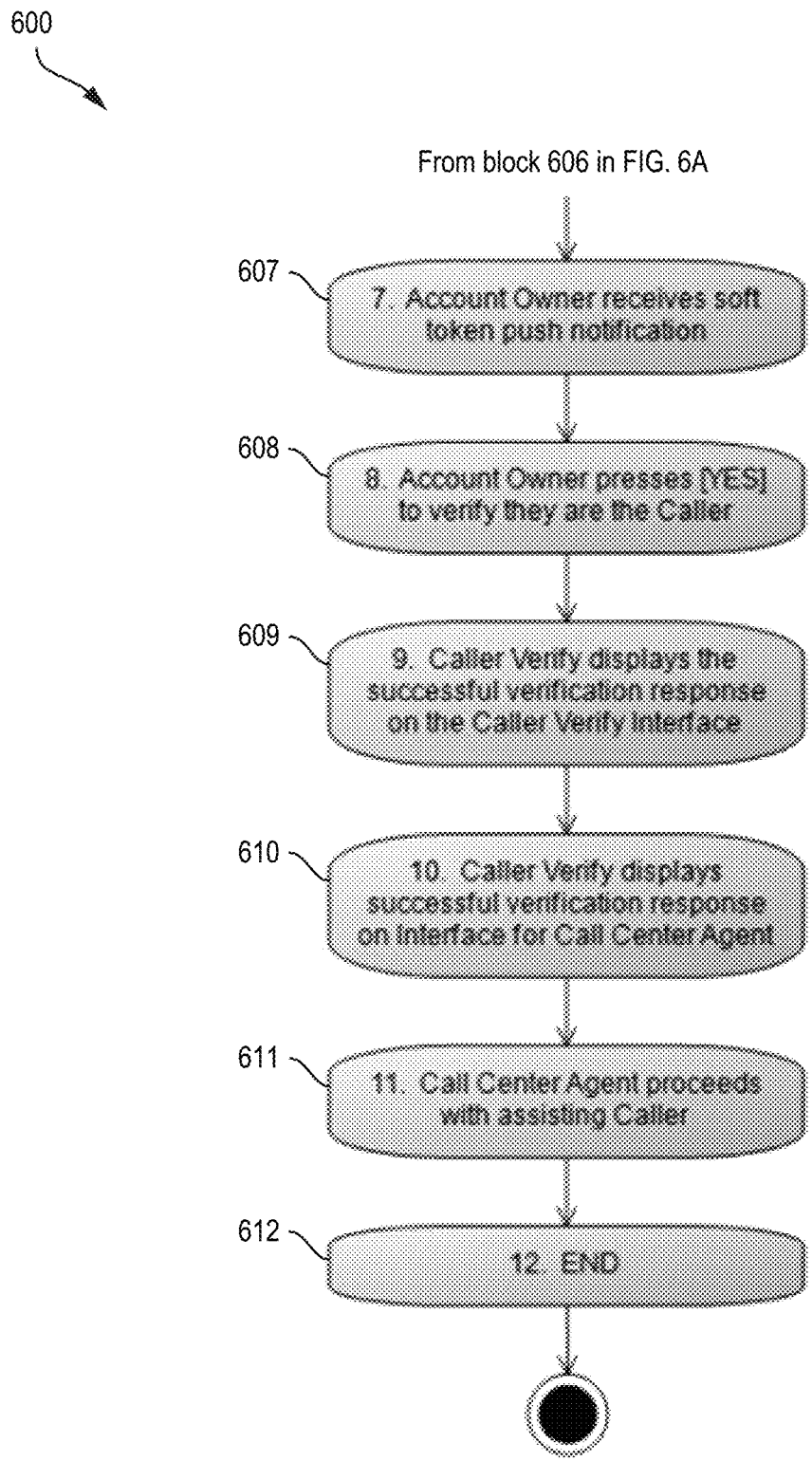
Figure 7A:
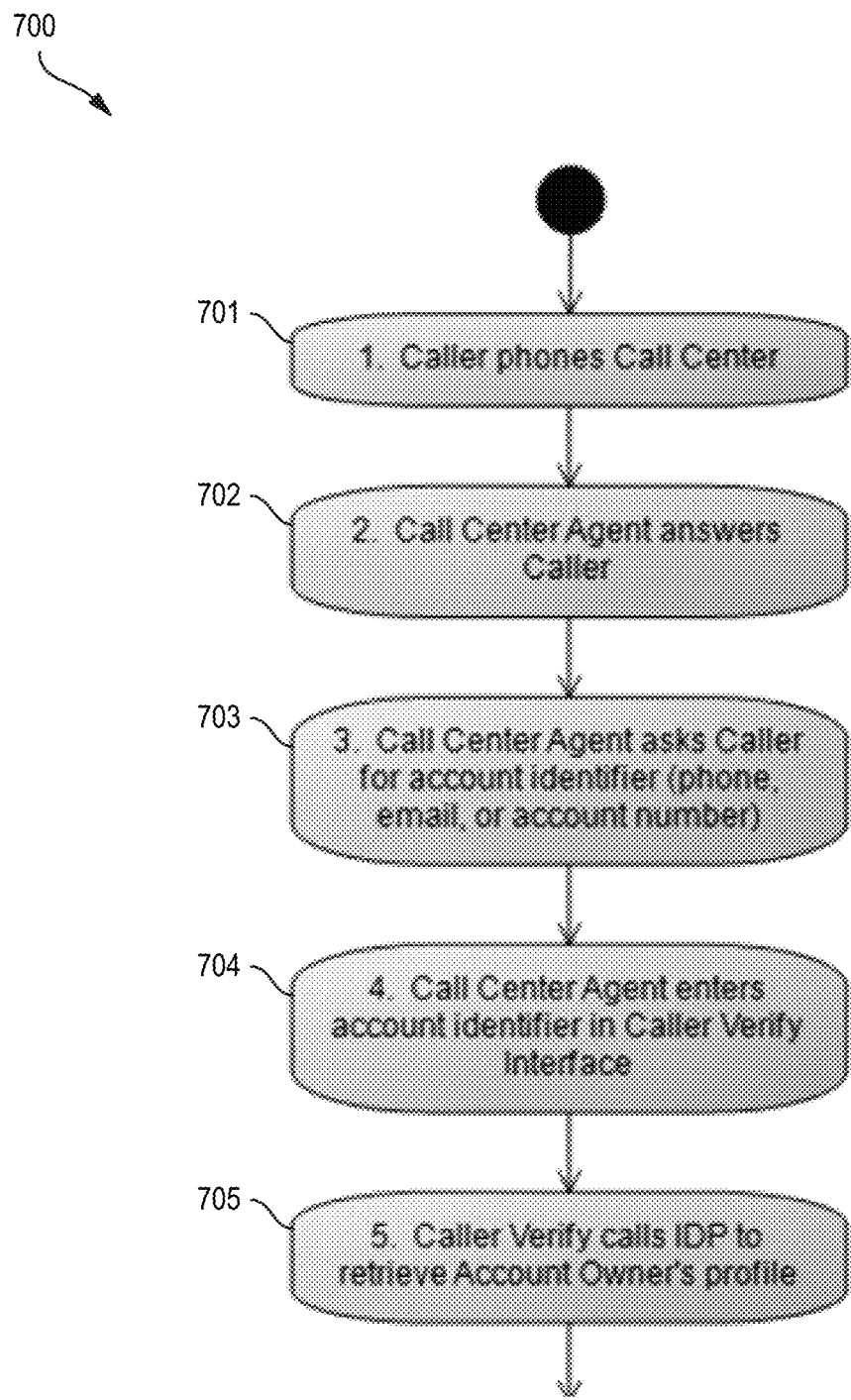
FIGS. 7A-7D illustrate a flow chart of a method of caller verification via soft token failure with a call center agent, according to an embodiment.
Figure 7B:
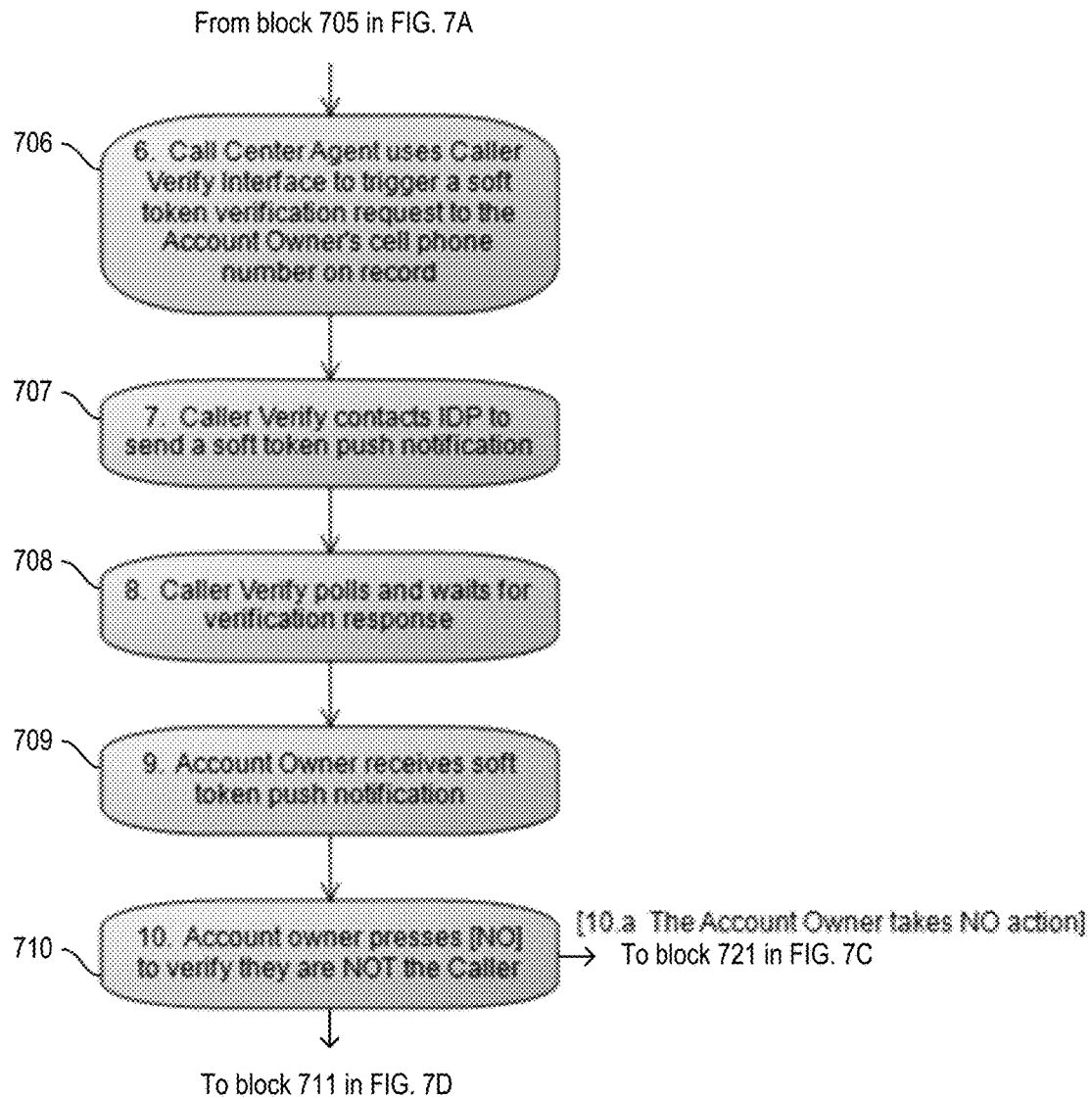
Figure 7C:
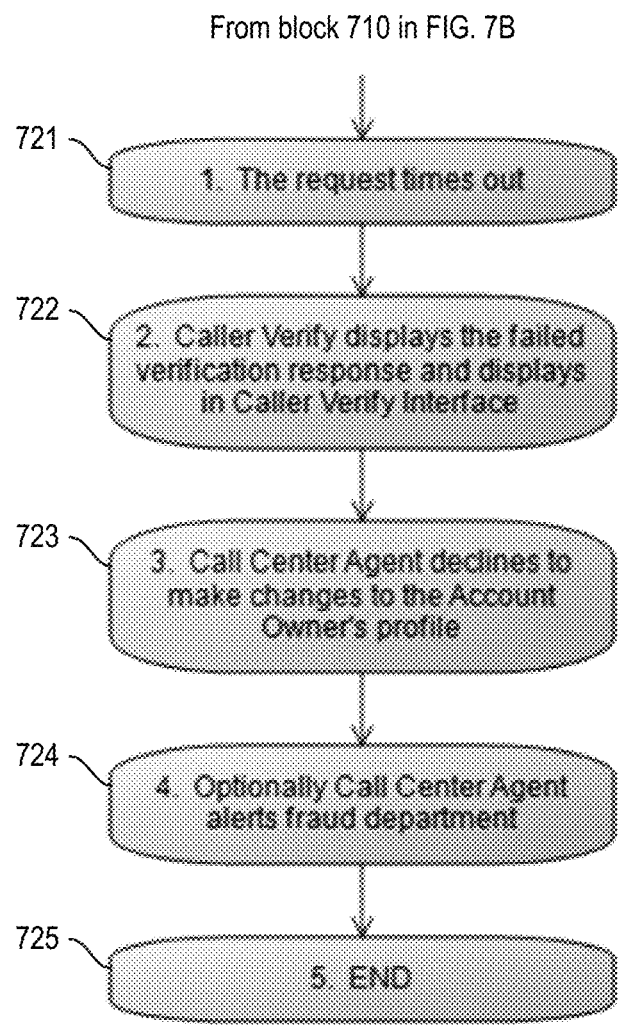
Figure 7D:
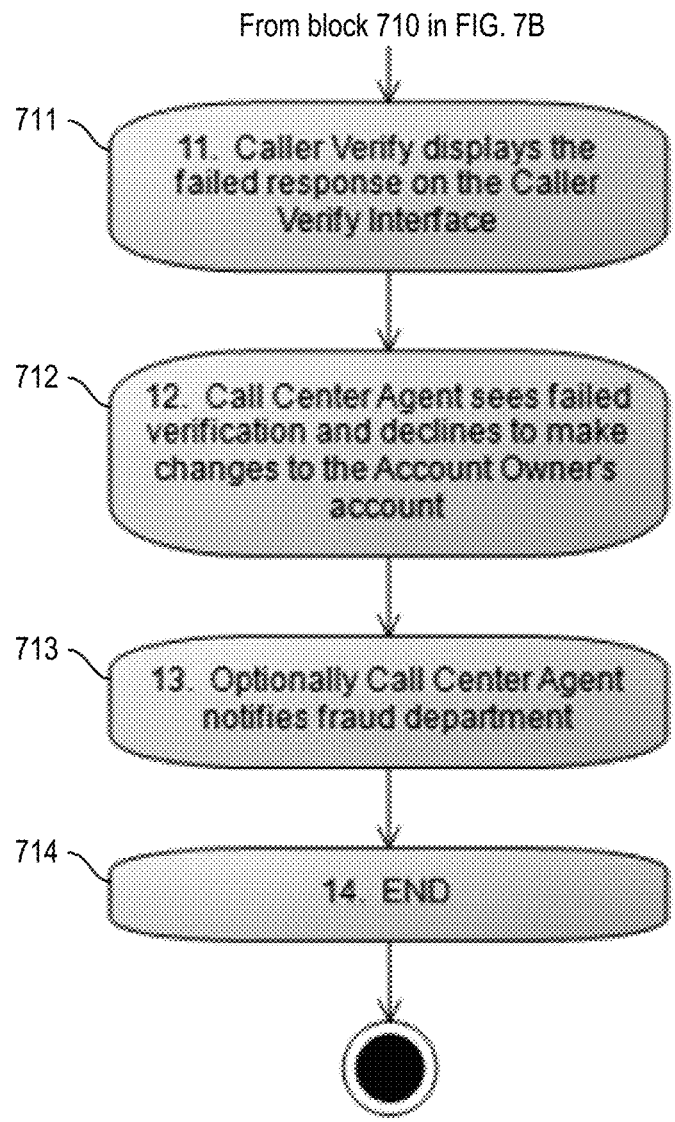
Figure 8A:
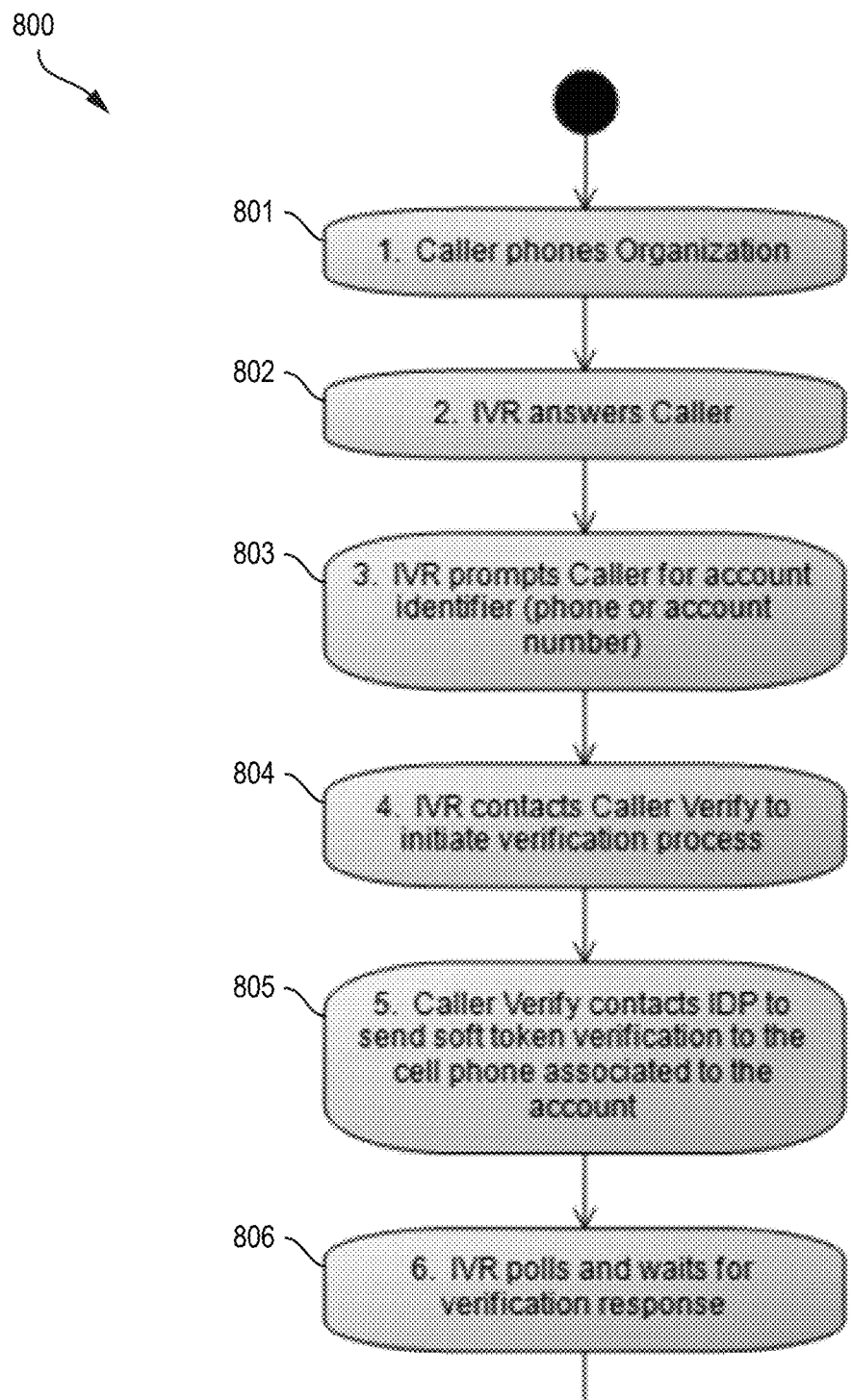
FIGS. 8A-8B illustrate a flow chart of a method of caller verification via soft token success with IVR, according to an embodiment.
Figure 8B:
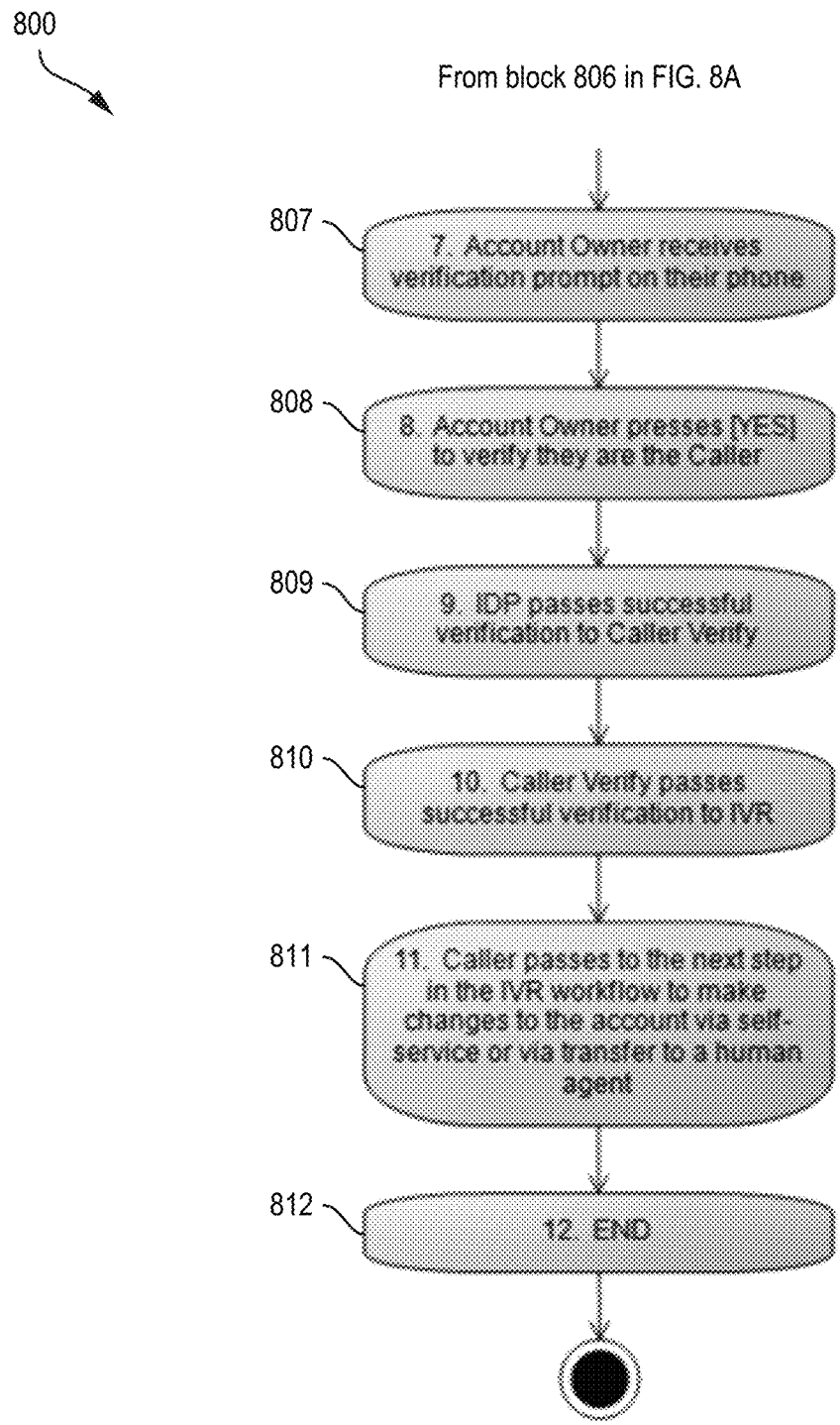
Figure 9A:
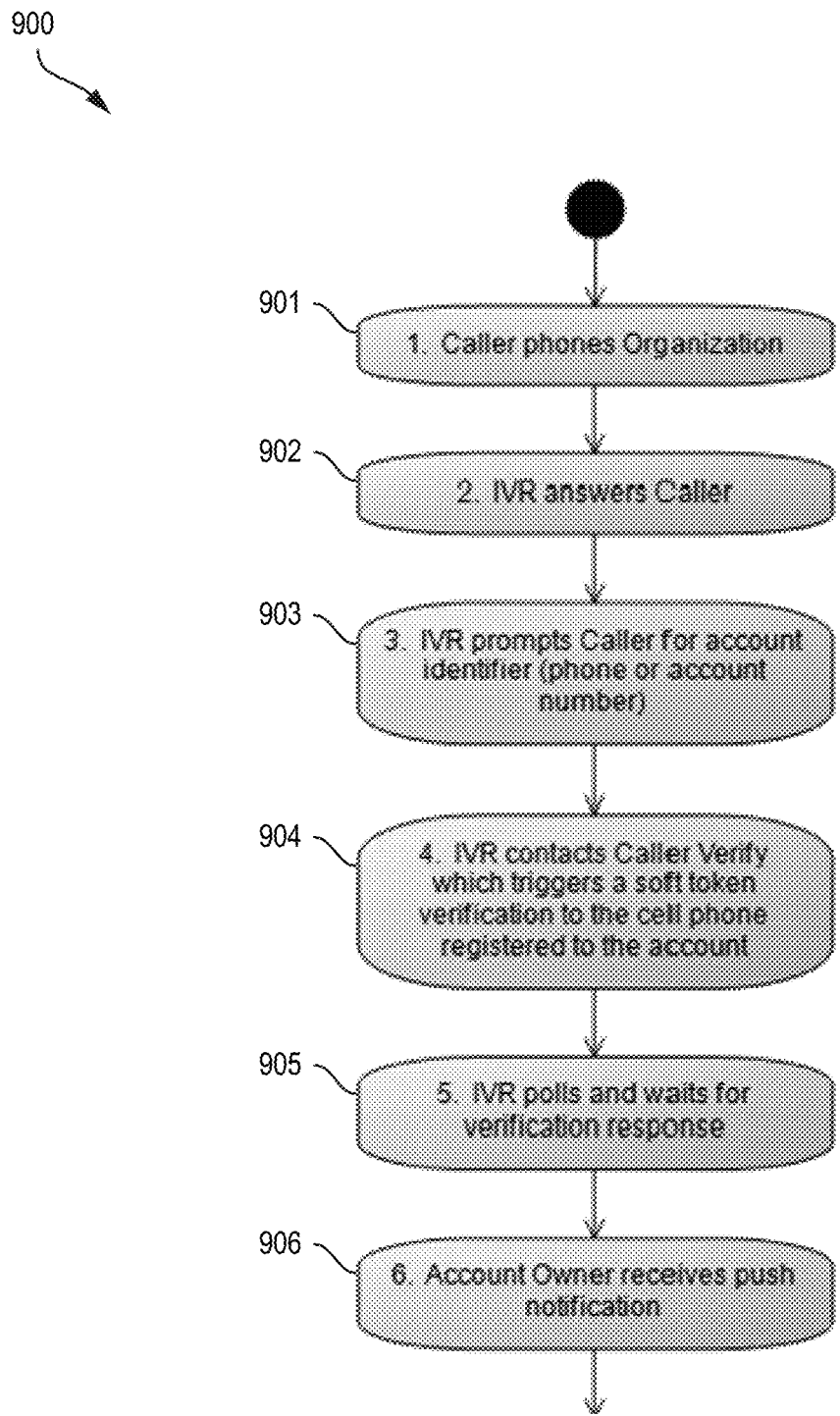
FIGS. 9A-9B illustrate a flow chart of a method of caller verification via soft token failure with IVR, according to an embodiment.
Figure 9B:
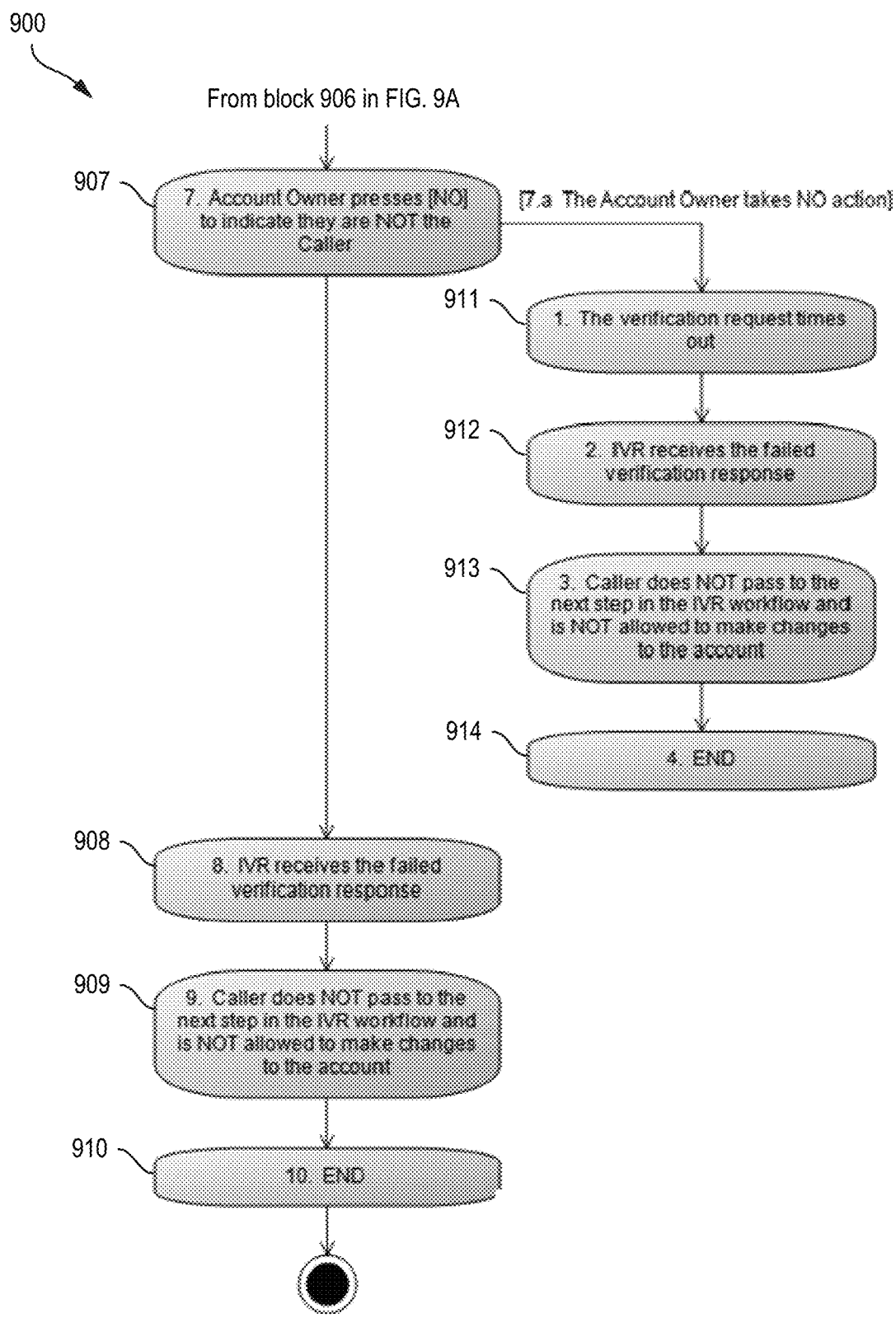

FIGS. 6A-6B illustrate a flow chart of a method 600 of caller verification via soft token success with a call center agent, in an embodiment. FIGS. 7A-7D illustrate a flow chart of a method 700 of caller verification via soft token failure with a call center agent, in an embodiment. FIGS. 8A-8B illustrate a flow chart of a method 800 of caller verification via soft token success with IVR, in an embodiment. FIGS. 9A-9B illustrate a flow chart of a method 900 of caller verification via soft token failure with IVR, in an embodiment.

Methods 600, 700, 800 and 900 can be performed, in an example, by components of system 100 as disclosed herein. Actors of methods 600, 700, 800 and 900 and associated goals, are described by way of example below.

A Caller may be a person who phones the Organization for the purpose of making changes to an account they claim to own, and their goal may be to make changes to the account that they claim to own.

A Call Center may be the place of employment for the Call Center Agent, where a group of human workers answer calls and make changes to accounts if the Caller is successfully verified as the rightful Account Owner, and their goal may be to facilitate rightful Account Owners accessing their account(s).

An IVR may be an automated telephony system, its goal to automate call center workflow.

An IDP is an Identity Provider, and may be a 3rd party tool used that is the authoritative source of Account Owner profiles including attributes like: first name, last name, phone number, email address. Caller Verify makes calls to the IDP in the course of identifying the user. The IDP can trigger soft token via push notifications to verify that the Caller trying to authenticate is who they say they are. Examples of possible IDP are solutions like OKTA or PING Federate. Goals of the IDP may be to act as the authoritative source for Account Owner attributes such as first name, last name, cell phone number, and email address; act as a source of registration of soft tokens to rightful Account Owners (outside the scope of these use cases but exists as a functional process pre-condition); and trigger soft token push notifications and verify the response to those notifications.

An Account Owner may be a person who is the rightful owner of the account that the Caller wants to make changes to, and their goal may be to use a soft token verification to protect unauthorized access to their account.

A Call Center Agent may be a person who works in the Organization's Call Center answering phone calls and has access to the Caller Verify Interface, and their goals may be to use Caller Verify to ensure they only allow rightful Account Owners to make changes to their account; optionally notify a fraud department if an unauthorized Caller is trying to access an account; assist the Caller in the most efficient and secure way possible.

An Organization may be a Company, Non-profit or other entity that hosts the account the Caller wants to modify and owns the IVR or Call Center that the Caller calls into, and their goals may be to reduce fraud by ensuring Callers are only permitted to make changes to account(s) of which they are the rightful owner; mitigate risk of a breach by ensuring Callers are only permitted to make changes to account(s) of which they are the rightful owner; provide a low friction experience to their Account Owners; meet audit requirements and meet or exceed the security standards to which their industry is held accountable.

A Caller Verify may be an embodiment of caller verify 106, to facilitate a process by which a Caller is verified using a soft token that the Account Owner has previously registered to their profile in the IDP, the goals may be to inform the Call Center Agent OR the IVR if a Caller is the rightful Account Owner or not and to verify Callers in the most efficient and secure way possible.

Turning to FIGS. 6A-6B, method 600 is illustrated for caller verification via soft token success performed, in an example, by components of system 100 including a call center agent, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

As shown in FIGS. 6A-6B, Caller phones into a Call Center and the answering Call Center Agent asks the Caller for a unique identifier to search for account (phone, email, account number, etc.). The Call Center prompts the Caller to verify they own the account they are calling about. The Account Owner touches the [YES] button on the soft token application on their smart phone. After this successful verification that the Caller is the rightful Account Owner, the Caller is permitted to make changes to the account.

A precondition may be that Account Owner has registered their profile in the identity provider (IDP) with a soft token.

A success guarantee may be that Caller is successfully verified as the rightful Account Owner with their soft token and permitted to make changes to the account as a result.

A main success scenario for method 600 is described below. Account Owner has registered their profile in the identity provider (IDP) with a soft token.

At block 601, Caller phones Call Center.

At block 602, Call Center Agent answers Caller.

At block 603, Call Center Agent asks the Caller for account identifier (phone, email, or account number).

Figure 10A:
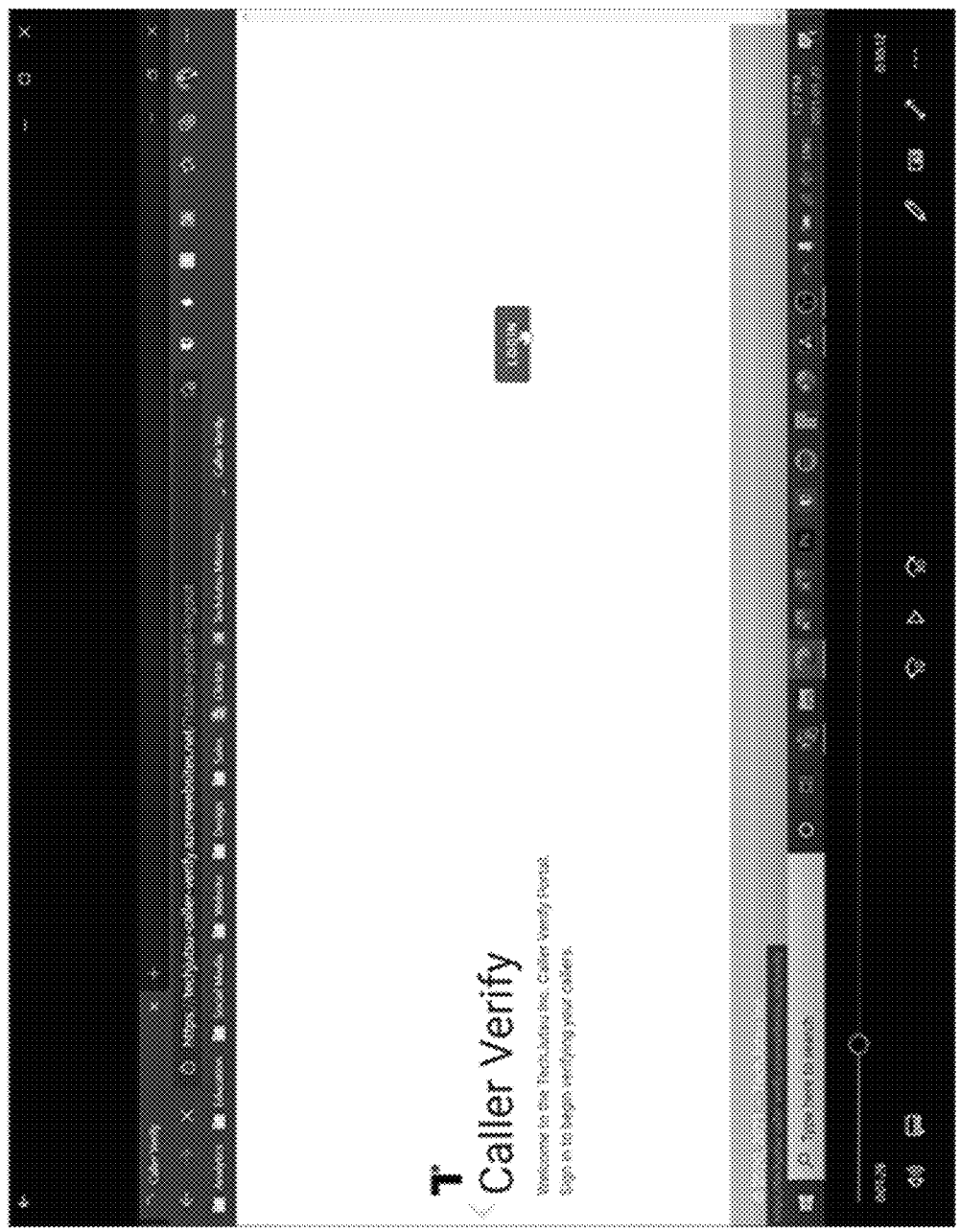
FIGS. 10A-10I illustrate screenshots of a caller verify web interface, according to an embodiment.
Figure 10B:
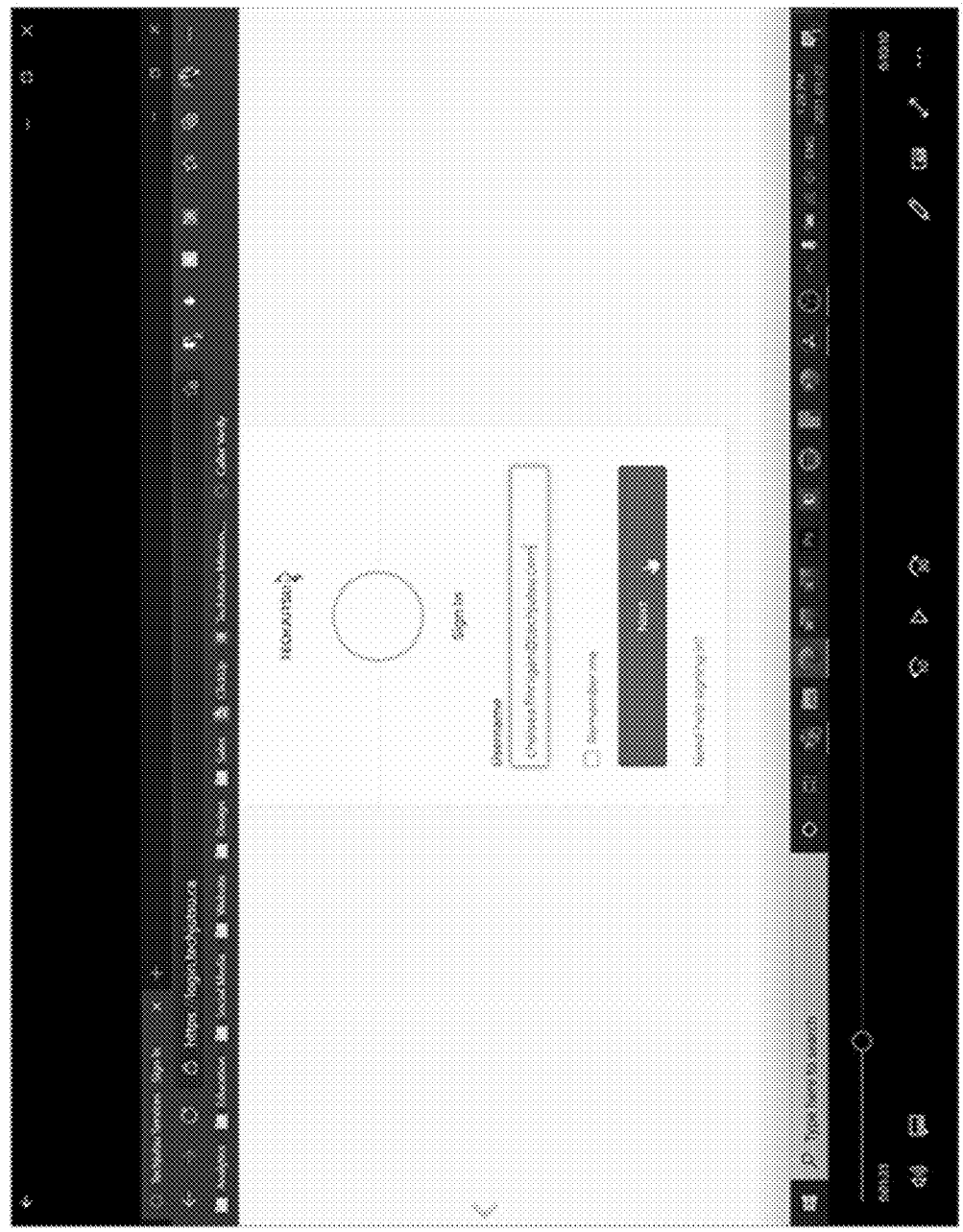
Figure 10C:
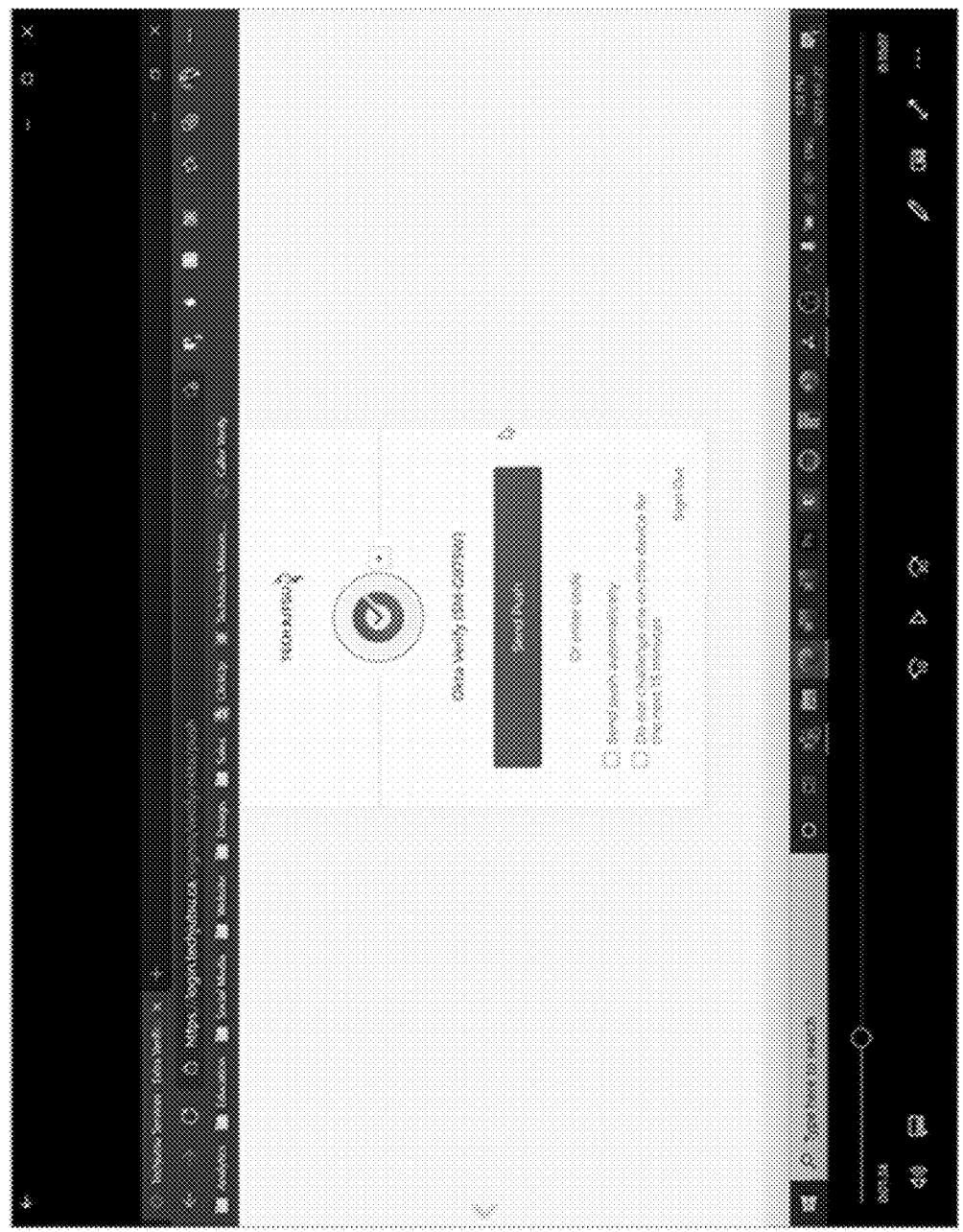
Figure 10D:
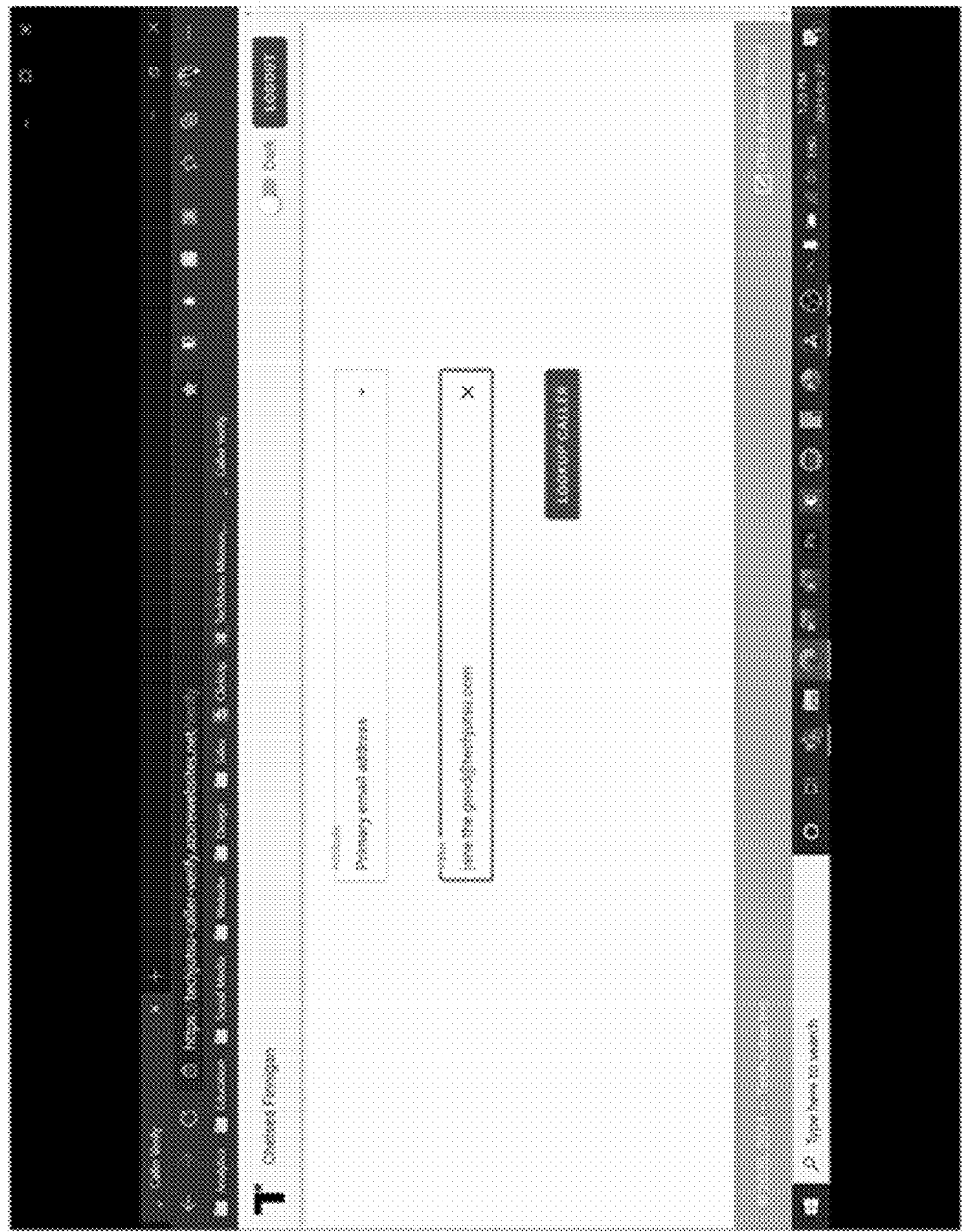

At block 604, Call Center Agent uses Caller Verify Interface to find the Account Owner using the unique identifier provided by the Caller. FIG. 10A illustrates a screenshot 1002 of web interface 116 of caller verify 106, prompting a login for a call center agent, in an embodiment. FIG. 10B illustrates a screenshot 1004 of a sign in page and FIG. 10C illustrates a screenshot 1006 of a prompt for soft token authentication for the call center agent. FIG. 10D illustrates a screenshot 1008 of entry of the unique identifier, in this example, a primary email address.

Figure 10E:
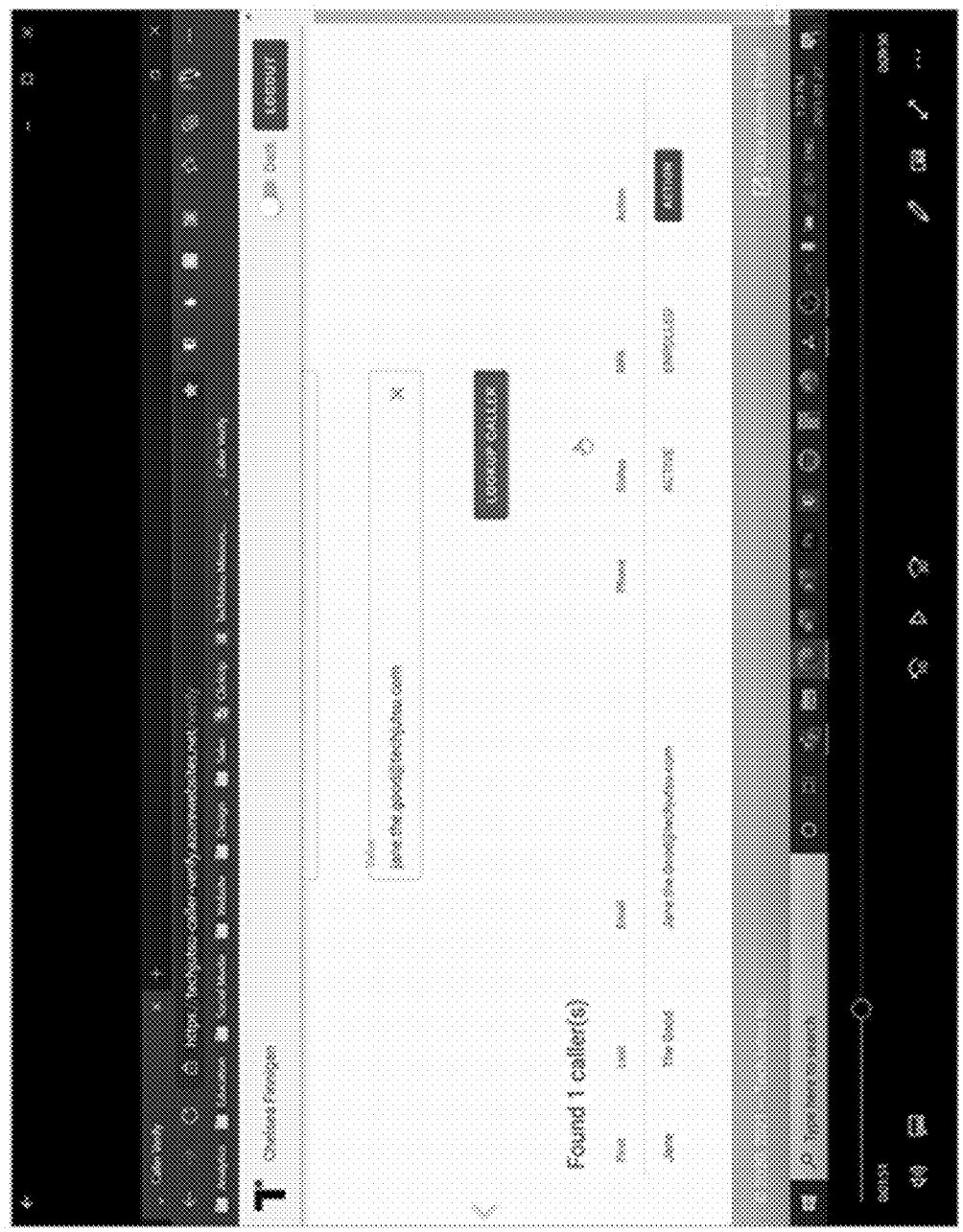
Figure 10F:
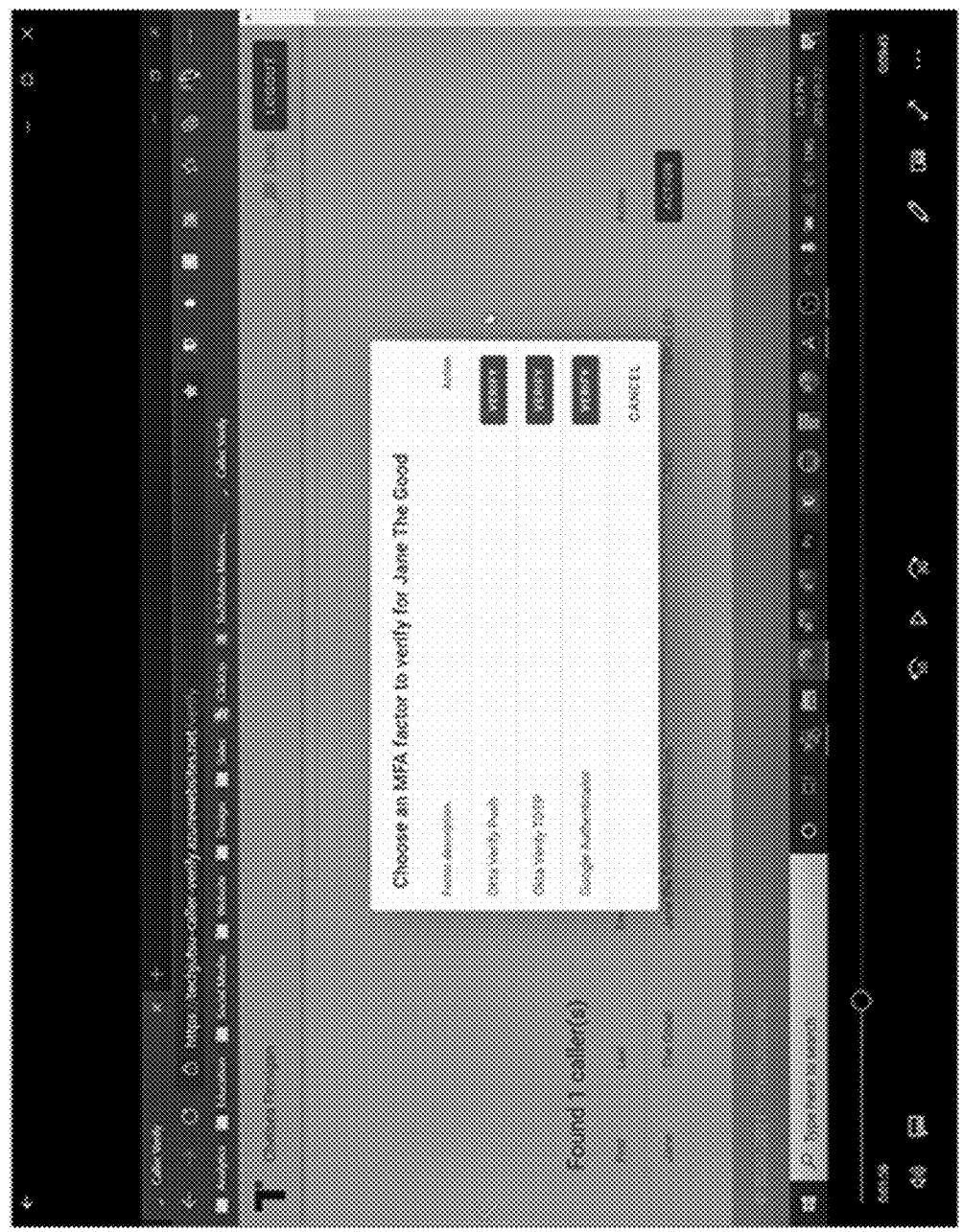

At block 605, Call Center Agent uses Caller Verify Interface to trigger a soft token verification request to the Account Owner's cell phone number on record. FIG. 10E illustrates a screenshot 1010 of a lookup of the caller or account, and an action option. FIG. 10F illustrates a screenshot 1012 of options for authentication verify the account, including, by way of example, Okta Verify Push, Okta Verify TOTP, and Google Authenticator, which can be MFA from the perspective of IDP 108 that can use both password and second factor to authenticate users in their online experience.

Figure 10G:
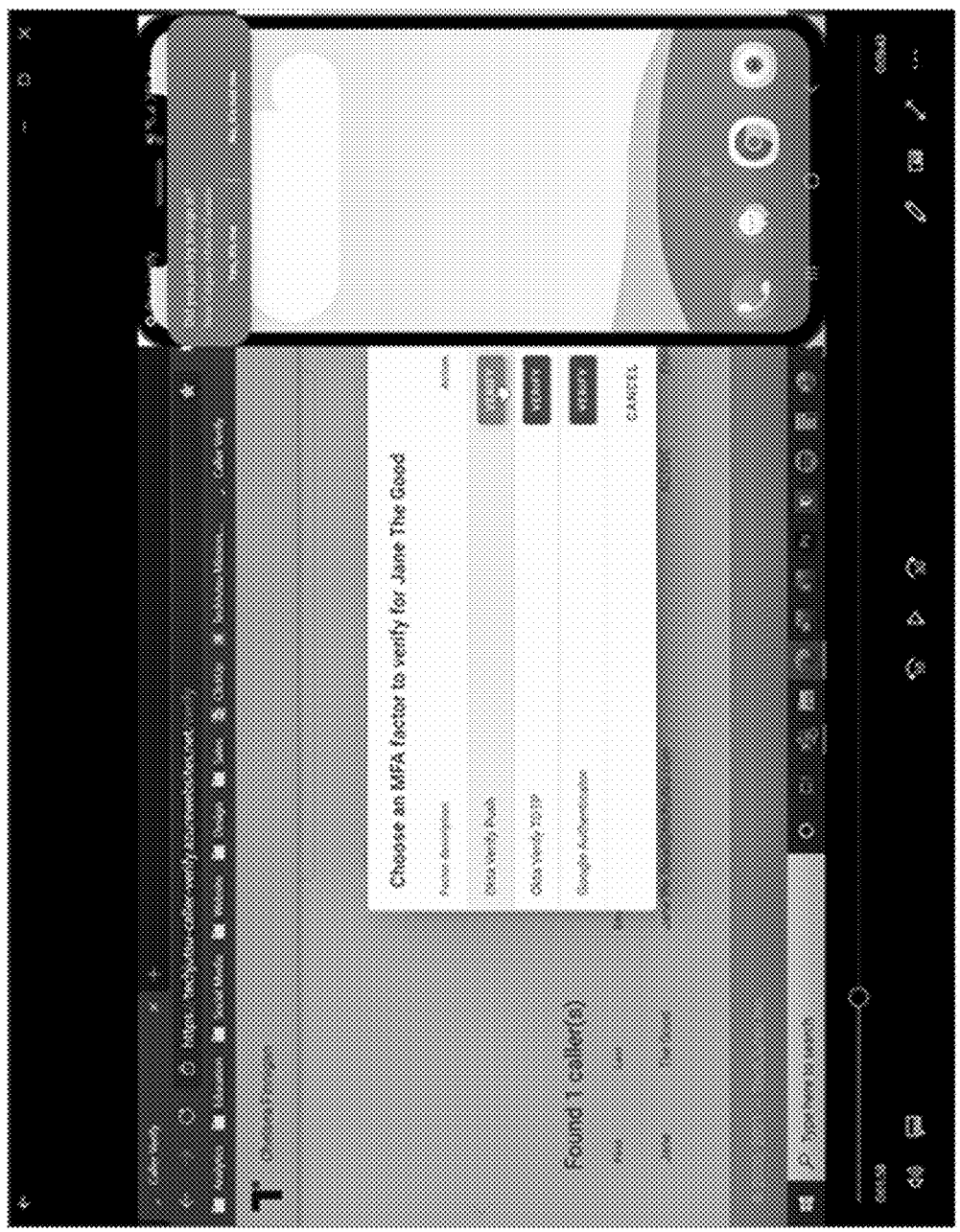

At block 606, Caller Verify contacts IDP to send soft token push notification. FIG. 10G illustrates a screenshot 1014 of selection of "Okta Verify Push", and a screenshot of a push notification received at local device 102.

Figure 10H:
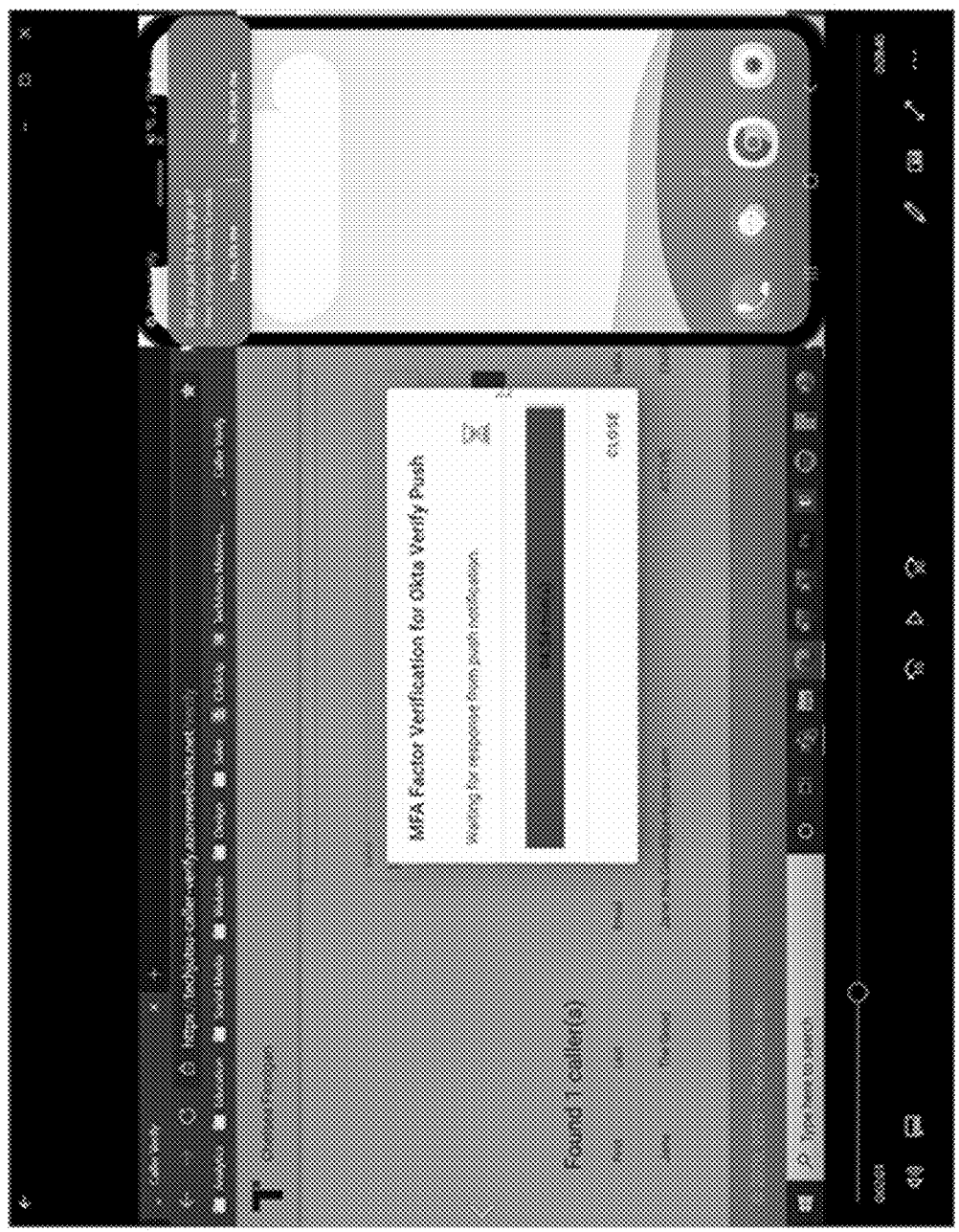

At block 607, Account Owner receives soft token push notification. FIG. 10H illustrates a screenshot 1016 of web interface 116 awaiting response from the push notification, and a screenshot of the push notification at local device 102.

At block 608, Account Owner presses [YES] to verify they are the Caller.

Figure 10I:
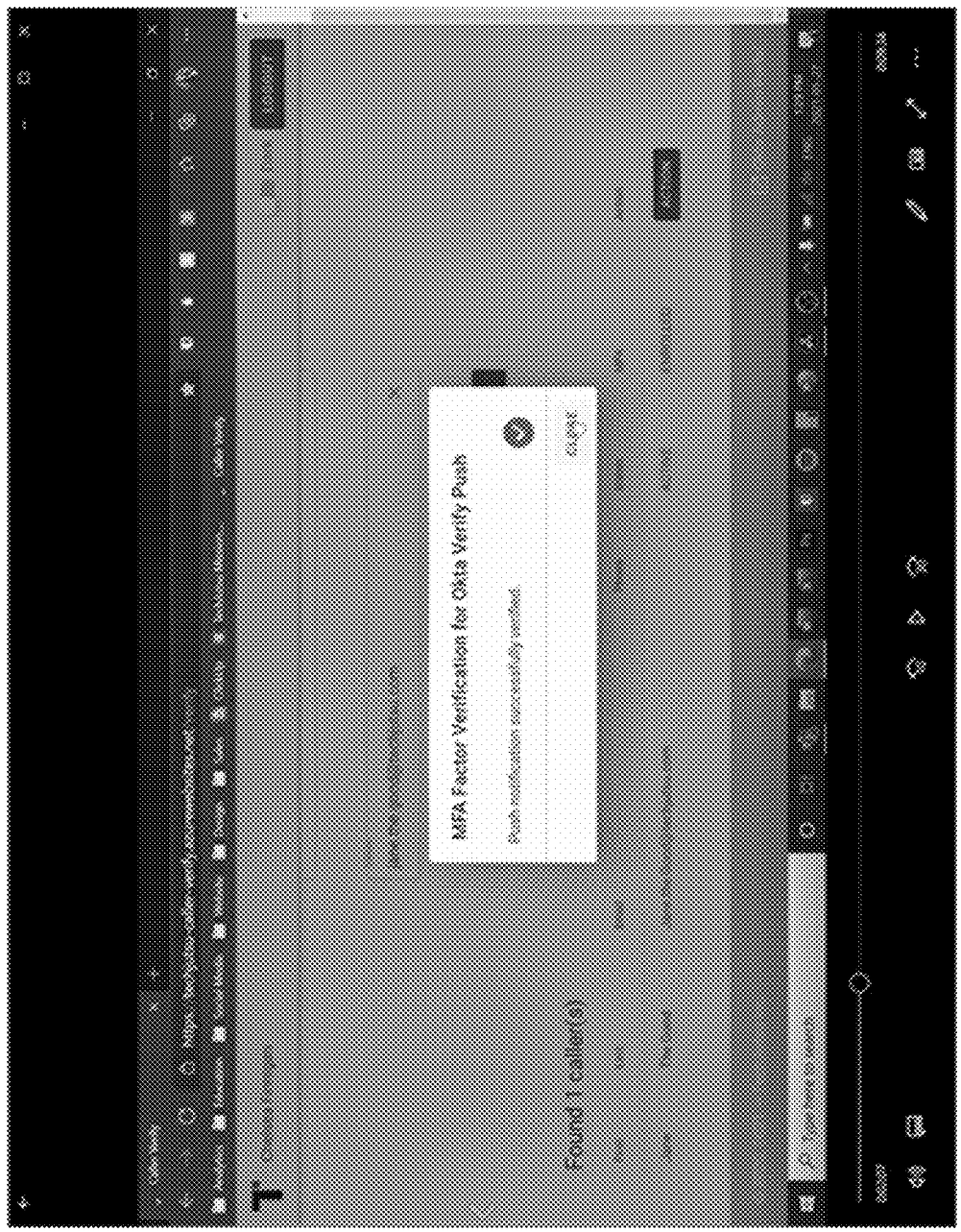

At block 609, Caller Verify displays the successful verification response on the Caller Verify Interface. FIG. 10I illustrates a screenshot 1018 of a confirmation of push notification successfully verified.

At block 610, Caller Verify displays successful verification response on Interface for Call Center Agent.

At block 611, Call Center Agent proceeds with assisting Caller.

At block 612, control ends. Caller is successfully verified as the rightful Account Owner with their soft token and permitted to make changes to the account as a result.

Turning to FIGS. 7A-7D, method 700 is illustrated for caller verification via soft token failure performed, in an example, by components of system 100 including a call center agent, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

As shown in FIGS. 7A-7D, Caller phones into a Call Center and a Call Center Agent answers and prompts the Caller to verify they own the account they are calling about. The Account Owner touches the [NO] button on the soft token application. After this failed verification, the Caller is NOT permitted to make changes to the account.

A precondition may be that Account Owner has registered their profile in the identity provider (IDP) with a soft token.

A success guarantee may be that Caller fails to be verified with the rightful Account Owner's soft token and is NOT permitted to make changes to the account.

A main success scenario for method 700 is described below. Account Owner has registered their profile in the identity provider (IDP) with a soft token.

At block 701, Caller phones Call Center.

At block 702, Call Center Agent answers Caller.

At block 703, Call Center Agent asks Caller for account identifier (phone, email, or account number).

At block 704, Call Center Agent enters account identifier in Caller Verify Interface.

At block 705, Caller Verify calls IDP to retrieve Account Owner's profile.

At block 706, Call Center Agent uses Caller Verify Interface to trigger a soft token verification request to the Account Owner's cell phone number on record.

At block 707, Caller Verify contacts IDP to send a soft token push notification.

At block 708, Caller Verify polls and waits for verification response.

At block 709, Account Owner receives soft token push notification.

At block 710, Account owner presses [NO] to verify they are NOT the Caller.

If the Account Owner takes no action, control proceeds to block 721 as an extension. Otherwise, control proceeds to block 711.

At block 721, the request times out.

At block 722, Caller Verify displays the failed verification response and displays in Caller Verify interface.

At block 723, Call Center Agent declines to make changes to the Account Owner's profile.

At block 724, optionally Call Center Agent alerts fraud department.

At block 725, control ends.

Returning to block 711, Caller Verify displays the failed response on the Caller Verify Interface.

At block 712, Call Center Agent sees failed verification and declines to make changes to the Account Owner's account.

At block 713, optionally Call Center Agent notifies fraud department.

At block 714, control ends. Caller fails to be verified with the rightful Account Owner's soft token and is not permitted to make changes to the account.

Turning to FIGS. 8A-8B, method 800 is illustrated for caller verification via soft token success performed, in an example, by components of system 100 including an IVR, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

As shown in FIGS. 8A-8B, Caller phones into an Organization and an IVR (automated telephony system) prompts the Caller to verify they own the account they are calling about. The Account Owner touches the [YES] button on the soft token application. After this successful verification that the Caller is the rightful Account Owner, the Caller is permitted to make changes to the account.

A precondition may be that Account Owner has registered their profile in the identity provider (IDP) with a soft token.

A success guarantee may be that Caller is successfully verified as the rightful Account Owner with their soft token and permitted to make changes to the account as a result.

A main success scenario for method 800 is described below. Account Owner has registered their profile in the identity provider (IDP) with a soft token.

At block 801, Caller phones Organization.

At block 802, IVR answers Caller.

At block 803, IVR prompts Caller for account identifier (phone or account number).

At block 804, IVR contacts Caller Verify to initiate verification process.

At block 805, Caller Verify contacts IDP to send soft token verification to the cell phone associated to the account.

At block 806, IVR polls and waits for verification response.

At block 807, Account Owner receives verification prompt on their phone.

At block 808, Account Owner presses [YES] to verify they are the Caller.

At block 809, IDP passes successful verification to Caller Verify.

At block 810, Caller Verify passes successful verification to IVR.

At block 811, Caller passes to the next step in the IVR workflow to make changes to the account via self-service or via transfer to a human agent.

At block 812, control ends. Caller is successfully verified as the rightful Account Owner with their soft token and permitted to make changes to the account as a result.

Turning to FIGS. 9A-9B, method 900 is illustrated for caller verification via soft token failure performed, in an example, by components of system 100 including an IVR, according to an embodiment. The steps are provided for illustrative purposes. Variations of the steps, omission or substitution of various steps, or additional steps may be considered. It should be understood that one or more of the blocks may be performed in a different sequence or in an interleaved or iterative manner.

As shown in FIGS. 9A-9B, Caller phones an Organization and an IVR (automated telephony system) prompts the Caller to verify they own the account they are calling about. The Account Owner touches the [NO] button on the soft token application. After this failed verification, the Caller is not permitted to make changes to the account.

A precondition may be that Account Owner has registered their profile in the identity provider (IDP) with a soft token.

A success guarantee may be that Caller fails to be verified with the rightful Account Owner's soft token and is NOT permitted to make changes to the account as a result.

A main success scenario for method 900 is described below. Account Owner has registered their profile in the identity provider (IDP) with a soft token.

At block 901, Caller phones Organization.

At block 902, IVR answers Caller.

At block 903, IVR prompts Caller for account identifier (phone or account number).

At block 904, IVR contacts Caller Verify which triggers a soft token verification to the cell phone registered to the account.

At block 905, IVR polls and waits for verification response.

At block 906, Account Owner receives push notification.

At block 907, Account Owner presses [NO] to indicate they are NOT the Caller.

If the Account Owner takes no action, control flow proceeds to block 911. Otherwise, control flow proceeds to block 908.

At block 911, the verification request times out.

At block 912, IVR receives the failed verification response.

At block 913, Caller does NOT pass to the next step in the IVR workflow and is NOT allowed to make changes to the account.

At block 914, control ends.

Returning to block 908, IVR receives the failed verification response.

At block 909, Caller does NOT pass to the next step in the IVR workflow and is NOT allowed to make changes to the account.

At block 910, control ends. Caller fails to be verified with the rightful Account Owner's soft token and is not permitted to make changes to the account as a result.

Figure 11:
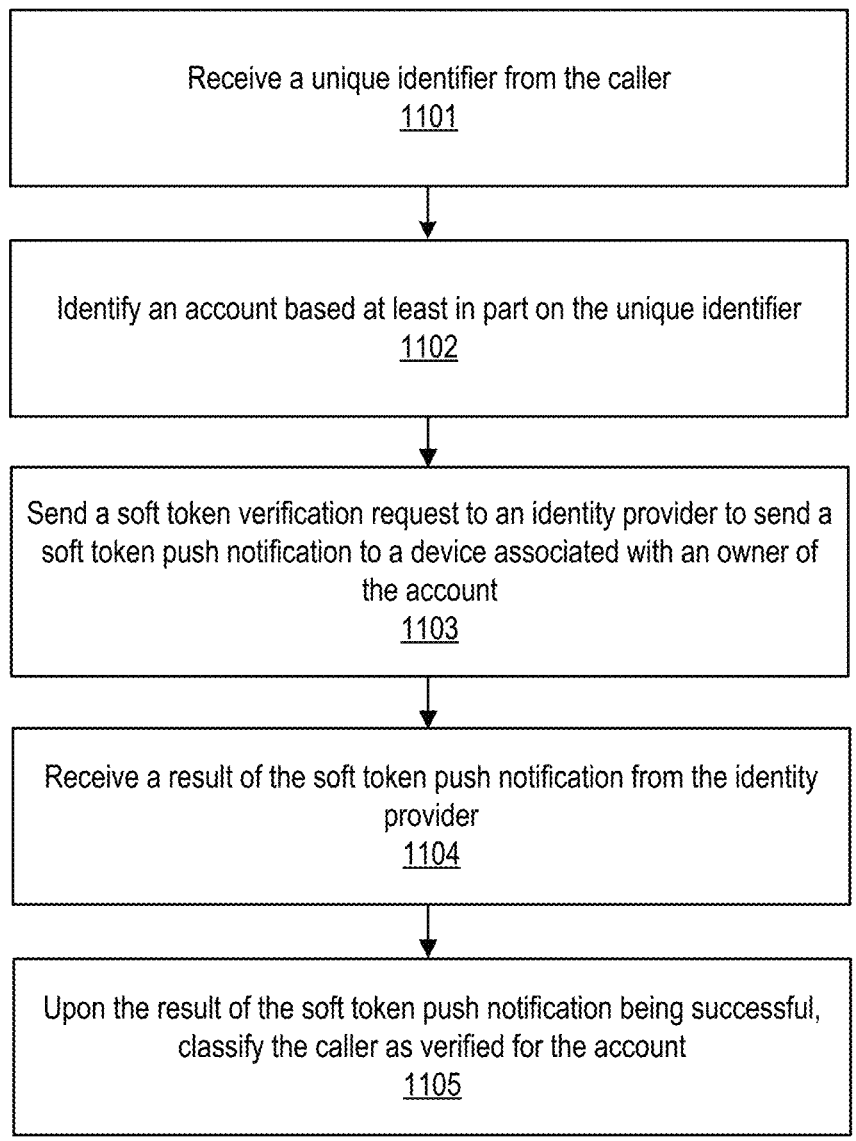
FIG. 11 is a flowchart of a method for verifying a caller, according to an embodiment.

FIG. 11 illustrates an embodiment of a method 1100 for verifying a caller performed, in an example, by components of system 100. The steps are provided for illustrative purposes. Variations of the steps, omission or substitution of various steps, or additional steps may be considered. It should be understood that one or more of the blocks may be performed in a different sequence or in an interleaved or iterative manner.

At block 1101, caller verify 106 receives a unique identifier from the caller, for example, by way of call center 114 or IVR 124.

In some embodiments, the unique identifier includes one or more of an email address, a phone number, or an account number.

At block 1102, caller verify 106 identifies an account based at least in part on the unique identifier.

At block 1103, caller verify 106 sends a soft token verification request to an identity provider, such as IDP 108, to send a soft token push notification to a device associated with an owner of the account, such as local device 102.

In some embodiments, the sending the soft token verification request is using an application programming interface (API).

In some embodiments, the API is a representational state transfer (REST) API.

At block 1104, caller verify 106 receives a result of the soft token push notification from the identity provider.

At block 1105, upon the result of the soft token push notification being successful, caller verify 106 classifies the caller as verified for the account.

In some embodiments, method 1100 further includes serving a web interface. In some embodiments, the serving the web interface is over Hypertext Transfer Protocol Secure (HTTPS). In some embodiments, method 1100 further includes caller verify 106 displaying the result on the web interface.

In some embodiments, method 1100 further includes upon the result being unsuccessful, caller verify 106 sending a notification of the response to a fraud department.

Figure 12:
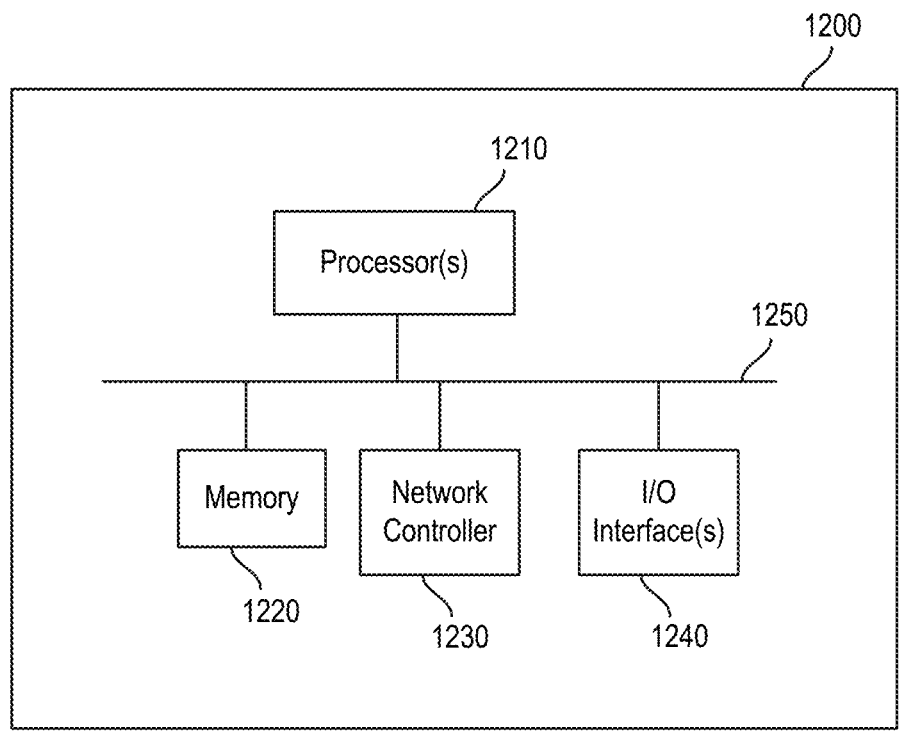
FIG. 12 is a block diagram of example hardware components of a computing device for caller verification, according to an embodiment.

System 100 for caller verification, or one or more components thereof, including local device 102, call receiver 104, caller verify 106, and IDP 108, may be implemented as software and/or hardware, for example, in one or more computing device(s) 1200 as illustrated in FIG. 12. Method 1100, in particular, one or more of blocks 1101 to 1105, may be performed by software and/or hardware of one or more computing device(s) such as computing device 1200.

FIG. 12 is a high-level block diagram of computing device 1200. Computing device 1200, under software control, may perform caller verification.

As illustrated, computing device 1200 includes one or more processor(s) 1210, memory 1220, a network controller 1230, and one or more I/O interfaces 1240 in communication over bus 1250.

Processor(s) 1210 may be one or more Intel x86, Intel x64, AMD x86-64, PowerPC, ARM processors or the like.

Memory 1220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 1230 serves as a communication device to interconnect the computing device with one or more computer networks such as, for example, a local area network (LAN) or the Internet.

One or more I/O interfaces 1240 may serve to interconnect the computing device with peripheral devices, such as for example, keyboards, mice, video displays, and the like. Such peripheral devices may include a display of device 1200. Optionally, network controller 1260 may be accessed via the one or more I/O interfaces.

Software instructions are executed by processor(s) 1210 from a computer-readable medium. For example, software may be loaded into random-access memory from persistent storage of memory 1220 or from one or more devices via I/O interfaces 1240 for execution by one or more processors 1210. As another example, software may be loaded and executed by one or more processors 1210 directly from read-only memory.

Example software components and data stored within memory 1220 of computing device 1200 may include software to perform caller verification, as disclosed herein, and operating system (OS) software allowing for basic communication and application operations related to computing device 1200.

Traditional run-of-the-mill security questions make fraudulent impersonation more common than ever. With embodiments of the system and method of caller verification disclosed herein, bad actors may be prevented from accessing an organization's users' confidential information. Embodiments disclosed herein send a push notification to the account owner's phone, so if the account owner is not trying to access their account they can press [NO] or ignore it, and only the real account owner may be able to verify their account.

Figure 13:
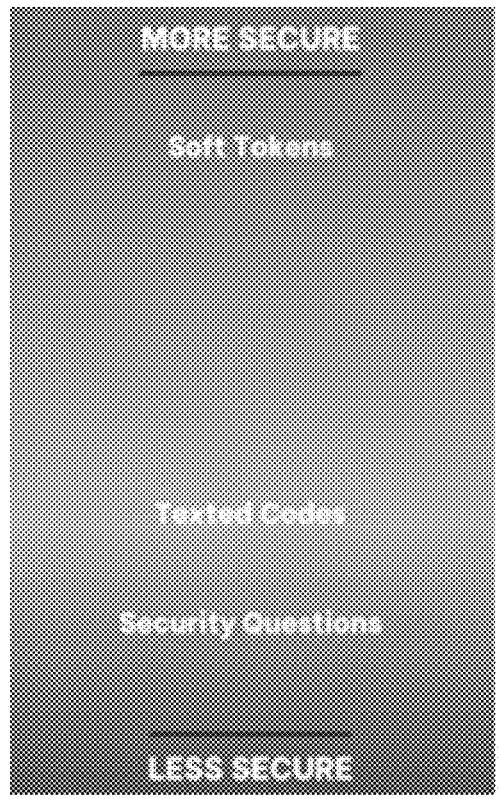
FIG. 13 is a heat map illustrating the relative security of soft tokens, texted codes, and security questions, according to an embodiment.

Conveniently, the simplicity of the one touch verification makes the process accessible to callers with technical, memory or visual challenges. Embodiments disclosed herein may be more secure than the traditional methods of verifying callers via security questions, PINs, passwords or text messages. Soft tokens may provide an increased level of security over traditional techniques such as texted codes or security questions, as illustrated in the heat map of FIG. 13, illustrating the relative security of soft tokens, texted codes, and security questions, according to an embodiment.

Embodiments may extend the superior security of soft tokens to callers accessing their accounts via phone, where callers were previously verified by insecure methods such as being asked easily guessable security questions. Current security questions often include things like "What is your address?", "What is your birthday?" and other basic facts about a caller that can easily be found by fraudsters on social media or public records.

Embodiments may also improve the caller experience. Currently, callers are subjected to answering a barrage of security questions. These questions tend to be easily guessable, or so obscure that even the rightful account owner may not even know the answer to them. (e.g. "When was the anniversary of when we sent you your first credit card?").

In some embodiments, verification time may be reduced to under a minute, so customers can be assisted in record time (as compared to time it takes answering many verification questions).

In some embodiments, caller verification may be more accessible to callers who struggle with technology or are partially visually impaired. The ease of the solution may reduce the hurdle to callers that struggle with technology, as it is a one touch solution.

In a circumstance in which a caller loses their phone or local device they may not be able to authenticate with their phone. Once the account holder registers a soft token on their new device to the organization's Identity Provider (IDP) this would be resolved. In the event a caller is not able to register a soft token before they have to call in, they may have challenges verifying. It is recommended that the organization have a procedure to verify the caller via traditional means like security questions as a backup.

Account owners may require a soft token registered with the IDP to use Caller Verify. There is a short registration process to associate the soft token to the Account Owner's profile in the Identity Provider (IDP). This can be mitigated by customer service assisting the caller on initial registration and by clear instructions and documentation from the Organization. Documentation and instructional videos on the registration process can be provided to facilitate this process for Organizations.

Some of the use cases for embodiments of the system and method for caller verification disclosed herein include:

Verifying the identity of a Caller who is phoning a Call Center to make a high-risk change to their account at a financial institution. For example, to verify that Callers phoning in are who they say they are when they make major transactions or changes. Such transactions may include making changes to their banking information, wire transfers, or major payments. This may protect the financial institution from issues with family fraud, in which a family member who knew the answers to an elderly relative's security question would request transfers and access by posing as the Account Owner.

Verifying the identity of a Caller being serviced in a wealth management advisory session over phone or video conference. With the COVID-19 pandemic, many such services have gone virtual. As wealth management discussions typically deal with sensitive, high-value financial matters, it's imperative that the advisor knows that the person on the other end of the call is who they say they are.

Additional use cases for embodiments of the system and method for caller verification disclosed herein include:

Preventing the unauthorized porting of a cell phone number by accurately verifying the Caller requesting to port the phone number is who they say they are by their ability to respond to the push soft token notification. This may prove the Caller is both in possession of the phone that currently holds the phone number and have authenticated to that phone if the phone has security features like a PIN, face recognition or fingerprint to access the device. Regulators have mandated that telecoms solve this use case, which some are doing with a text verification, however text is inferior to a soft token from a security perspective (See NIST).

Verifying a Caller's identity when they are making significant transactions over the phone. For example, there is a common scam in the telecom industry where a bad actor will call a telecom and order a new smartphone (which may be valued at $1,000 or more), then have it sent to their "new address", which is not the "real address" of the Account Owner.

Airline ticket fraud, in which a bad actor orders an air ticket using stolen credit card information, is another big source of fraud. Requiring that the purchaser of a major item prove they are who they say they are would cut into a big source of fraud losses for airlines and credit card companies.

Large ticket fraud, in which a bad actor orders a high-value item using stolen credit card information. Requiring that the purchaser of a major item prove they are who they say they are would cut into a big source of fraud losses for telecommerce and credit card companies.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

REFERENCES

AARP Research. (2019, December). 2020 Tech and the 50+ Survey. Retrieved from AARP Research: https://www.aarp.org/content/dam/aarp/research/surveys_statistics/technology/2019/20 20-tech-trends-survey. doi.10.26419-2Fres.00329.001.pdf Paul A. Grassi, J. P. (2017, June). NIST Special Publication 800-63C: Digital Identity Guidelines: Federation and Assertions. Retrieved from NIST-National Institute of Standards and Technology (US Department of Commerce): https://pages. nist.gov/800-63-3/sp800-63c.html Pew Research Center. (2019 Jun. 12). Mobile Fact Sheet. Retrieved from Pew Research Center: https://www.pewresearch.org/internet/fact-sheet/mobile/

Statistics Canada. (2018). Table 22-10-0113-01 Use of Internet services and technologies by age group and household income quartile. Retrieved from Statistics Canada: https://www150.statcan.gc.ca/t1/tbl1/en/tv.action?pid=2210011301

What is claimed is:

1. A computer-implemented method for verifying a caller attempting to access a resource, the method comprising:
    registering, with a third party identity-providing entity, a device associated with an owner of an account, said registering including registering a soft token as a factor of authentication for said account;
    receiving, at a call receiver device, a call from the caller;
    receiving, at the call receiver device, a request for access to said account from the caller, said request for access comprising a unique identifier;
    accessing, by a user of the call receiver device, said user of the call receiver device being distinct from said caller, a caller verification entity via a web interface on said call receiver device, wherein hosting for said web interface is provided by a cloud provider in one or more geographically localized containers, said cloud provider providing access restrictions to said web interface, said accessing comprising:
       providing said user of said call receiver device with an access token;
       transmitting, by said call receiver device, a Hypertext Transfer Protocol Secure (HTTPS) request for access to said caller verification entity via a representational state transfer (REST) application programming interface (API);

confirming, by said cloud provider, that said user of said call receiver device complies with said access restrictions for said web interface;
confirming, by said cloud provider, that said call receiver device complies with said access restrictions for said web interface;
authenticating, by the caller verification entity, said user of said call receiver device based on said access token provided to said user of said call receiver device;
receiving, at the caller verification entity, said unique identifier from said call receiver device;
identifying, by said caller verification entity, an account based on the unique identifier, said identifying comprising:
transmitting, by said caller verification entity, said unique identifier to said third party identity-providing entity via said REST API;
identifying, by said third party identity-providing entity, said account based on the unique identifier;
displaying, on a graphical user interface of said caller verification entity, a plurality of authentication options for said account, said plurality of authentication options including at least a push, a time-based one-time password (TOTP), and an authenticator application;
selecting, by said user of said call receiver device, one of said plurality of authentication options;
sending, by said caller verification entity via said REST API, a soft token transmission request to said third party identity-providing entity;
responsive to receiving said soft token transmission request, transmitting, by said third party identity-providing entity via said REST API, a soft token push notification to said registered device associated with said owner of said account based on said registered soft token for said account, wherein said soft token push notification includes said selected authentication option;
receiving, at said caller verification entity, a result of said soft token push notification from said third party identity-providing entity; and
upon the result of the soft token push notification being successful, classifying the caller as verified at said caller verification entity;
granting access to said resource upon classifying the caller as verified at said caller verification entity; and
logging, by said caller verification entity, all verification events associated with said request for access to said account from said caller.

2. The computer-implemented method of claim 1, wherein serving the web interface is over Hypertext Transfer Protocol Secure (HTTPS).

3. The computer-implemented method of claim 1, further comprising displaying the result on the web interface at said caller verification entity.

4. The computer-implemented method of claim 1, wherein the unique identifier includes one or more of an email address, a phone number, or an account number.

5. The computer-implemented method of claim 1, further comprising upon the result being unsuccessful, sending a notification of the response to a fraud department.

6. A computer system comprising:
a processor; and
a non-transitory computer-readable storage medium having stored thereon computer-executable instructions that, when executed by the processor, cause the processor to:
register, with a third party identity-providing entity, a device associated with an owner of an account, said registering including registering a soft token as a factor of authentication for said account;
receive, at a call receiver device, a call from a caller;
receive, at the call receiver device, a request for access to said account from the caller, said request for access comprising a unique identifier;
access, by a user of the call receiver device, said user of said call receiver device being distinct from said caller, a caller verification entity via a web interface on said call receiver device, wherein hosting for said web interface is provided by a cloud provider in one or more geographically localized containers, said cloud provider providing access restrictions to said web interface, said accessing comprising:
providing said user of said call receiver device with an access token;
transmitting, by said call receiver device, a hypertext transfer protocol secure (HTTPS) request for access to said caller verification entity via a representational state transfer (REST) application programming interface (API);
confirming, by said cloud provider, that said user of said call receiver device complies with said access restrictions for said web interface;
confirming, by said cloud provider, that said call receiver device complies with said access restrictions for said web interface;
authenticating, by the caller verification entity, said user of said call receiver device based on said access token provided to said user of said call receiver device;
receive, at the caller verification entity, said unique identifier from said call receiver device;
identify, by said caller verification entity, an account based on the unique identifier, said identifying comprising:
transmitting, by said caller verification entity, said unique identifier to said third party identity-providing entity via said REST API;
identifying, by said third party identity-providing entity, said account based on the unique identifier;
display, on a graphical user interface of said caller verification entity, a plurality of authentication options for said account, said plurality of authentication options including at least a push, a time-based one-time password (TOTP), and an authenticator application;
select, by said user of said call receiver device, one of said plurality of authentication options;
send, by said caller verification entity via said REST API, a soft token transmission request to said third party identity-providing entity;
responsive to receiving said soft token transmission request, transmitting, by said third party identity-providing entity via said REST API, a soft token push notification to said registered device associated with said owner of said account based on said registered soft token for said account, wherein said soft token push notification includes said selected authentication option;
receive, at said caller verification entity, a result of said soft token push notification from said third party identity-providing entity;
upon the result of the soft token push notification being successful, classify the caller as verified at said caller verification entity;

grant access to said resource upon classifying the caller as verified at said caller verification entity; and log, by said caller verification entity, all verification events associated with said request for access to said account from said caller.

7. A non-transitory computer-readable storage medium having stored thereon computer-executable instructions that, when executed by one or more processors, cause the one or more processors to:

register, with a third party identity-providing entity, a device associated with an owner of an account, said registering including registering a soft token as a factor of authentication for said account;

receive, at a call receiver device, a call from a caller;

receive, at the call receiver device, a request for access to said account from the caller, said request for access comprising a unique identifier;

access, by a user of the call receiver device, said user of said call receiver device being distinct from said caller, a caller verification entity via a web interface on said call receiver device, wherein hosting for said web interface is provided by a cloud provider in one or more geographically localized containers, said cloud provider providing access restrictions to said web interface, said accessing comprising:

providing said user of said call receiver device with an access token;

transmitting, by said call receiver device, a hypertext transfer protocol secure (HTTPS) request for access to said caller verification entity via a representational state transfer (REST) application programming interface (API);

confirming, by said cloud provider, that said user of said call receiver device complies with said access restrictions for said web interface;

confirming, by said cloud provider, that said call receiver device complies with said access restrictions for said web interface;

authenticating, by the caller verification entity, said user of said call receiver device based on said access token provided to said user of said call receiver device;

receive, at the caller verification entity, said unique identifier from said call receiver device;

identify, by said caller verification entity, an account based on the unique identifier, said identifying comprising:

transmitting, by said caller verification entity, said unique identifier to said third party identity-providing entity via said REST API;

identifying, by said third party identity-providing entity, said account based on the unique identifier;

display, on a graphical user interface of said caller verification entity, a plurality of authentication options for said account, said plurality of authentication options including at least a push, a time-based one-time password (TOTP), and an authenticator application;

select, by said user of said call receiver device, one of said plurality of authentication options;

send, by said caller verification entity via said REST API, a soft token transmission request to said third party identity-providing entity;

responsive to receiving said soft token transmission request, transmit, by said third party identity-providing entity via said REST API, a soft token push notification to said registered device associated with said owner of said account based on said registered soft token for said account, wherein said soft token push notification includes said selected authentication option;

receive, at said caller verification entity, a result of said soft token push notification from said third party identity-providing entity; and upon the result of the soft token push notification being successful, classify the caller as verified at said caller verification entity;

grant access to said resource upon classifying the caller as verified at said caller verification entity; and log, by said caller verification entity, all verification events associated with said request for access to said account from said caller.

8. The computer-implemented method of claim 1, wherein said soft token push notification is customized to depict a brand associated with said resource while displayed on said device associated with said owner of said account.

9. The computer-implemented method of claim 1, further comprising, after sending said soft token transmission request, starting a timer.

10. The computer-implemented method of claim 9, wherein when said timer reaches a predetermined time limit without receiving said result of said soft token push notification, classifying said caller as unauthorized at said caller verification entity.

11. The computer-implemented method of claim 1, wherein said soft token push notification includes a geographical location of said caller verification entity.

12. The method of claim 1, further comprising automatically scaling up one of said geographically localized containers in response to a traffic spike.

13. The method of claim 1, wherein said access restrictions for said web interface comprise web application firewall rules targeting specific access to network segments.

14. The method of claim 1, wherein said access restrictions comprise restricting access to said web interface to only designated users from within an authorized network.

* * * * *